US012343985B2

(12) United States Patent
Landa et al.

(10) Patent No.: US 12,343,985 B2
(45) **Date of Patent: *Jul. 1, 2025**

(54) DIGITAL PRINTING PROCESS

(71) Applicant: LANDA CORPORATION LTD., Rehovot (IL)

(72) Inventors: Benzion Landa, Nes Ziona (IL); Yehoshua Sheinman, Ra'anana (IL); Sagi Abramovich, Ra'anana (IL); Galia Golodetz, Rehovot (IL); Gregory Nakhmanovich, Rishon Lezion (IL); Meir Soria, Jerusalem (IL)

(73) Assignee: LANDA CORPORATION LTD., Rehovot (IL)

( * ) Notice: Subject to any disclaimer, the term of this patent is extended or adjusted under 35 U.S.C. 154(b) by 54 days.

This patent is subject to a terminal disclaimer.

(21) Appl. No.: 18/083,532

(22) Filed: Dec. 18, 2022

(65) Prior Publication Data

US 2023/0202162 A1 Jun. 29, 2023

Related U.S. Application Data

(63) Continuation of application No. 17/184,411, filed on Feb. 24, 2021, now Pat. No. 11,559,982, which is a (Continued)

(51) Int. Cl.

*B41J 2/00* (2006.01)
*B41J 2/005* (2006.01)

(Continued)

(52) U.S. Cl.

CPC .......... *B41J 2/0057* (2013.01); *B41M 5/0256* (2013.01); *B41M 5/03* (2013.01); *B41N 10/00* (2013.01)

(58) Field of Classification Search

CPC ....... B41J 2/0057; B41M 5/0256; B41M 5/03

See application file for complete search history.

(56) References Cited

U.S. PATENT DOCUMENTS

| | | | |
|---|---|---|---|
| 3,935,055 | A | 1/1976 | Carmien |
| 4,792,473 | A | 12/1988 | Vitale |

(Continued)

FOREIGN PATENT DOCUMENTS

| | | | |
|---|---|---|---|
| CN | 101433074 | A | 5/2009 |
| CN | 102566343 | A | 7/2012 |

(Continued)

OTHER PUBLICATIONS

CN101433074A Machine Translation (by EPO and Google)—published May 13, 2009; Kyocera Mita Corp [JP].

(Continued)

*Primary Examiner* — Jason S Uhlenhake

(74) *Attorney, Agent, or Firm* — Momentum IP; Marc Van Dyke

(57) ABSTRACT

A printing process is disclosed which comprises directing droplets of an ink onto an intermediate transfer member to form an ink image, the ink including an organic polymeric resin and a coloring agent in an aqueous carrier, and the transfer member having a hydrophobic outer surface so that each ink droplet in the ink image spreads on impinging upon the intermediate transfer member to form an ink film. The ink is dried while the ink image is being transported by the intermediate transfer member by evaporating the aqueous carrier from the ink image to leave a residue film of resin and coloring agent. The residue film is then transferred to a substrate. The chemical compositions of the ink and of the surface of the intermediate transfer member are selected such that attractive intermolecular forces between molecules in the outer skin of each droplet and on the surface of the intermediate transfer member counteract the tendency of the (Continued)

ink film produced by each droplet to bead under the action of the surface tension of the aqueous carrier, without causing each droplet to spread by wetting the surface of the intermediate transfer member.

24 Claims, 9 Drawing Sheets

Related U.S. Application Data continuation of application No. 16/432,934, filed on Jun. 6, 2019, now Pat. No. 10,960,660, which is a continuation of application No. 15/708,151, filed on Sep. 19, 2017, now Pat. No. 10,357,963, which is a continuation of application No. 15/175,275, filed on Jun. 7, 2016, now Pat. No. 9,776,391, which is a continuation of application No. 14/382,751, filed as application No. PCT/IB2013/051716 on Mar. 5, 2013, now Pat. No. 9,381,736.

(60) Provisional application No. 61/640,642, filed on Apr. 30, 2012, provisional application No. 61/640,637, filed on Apr. 30, 2012, provisional application No. 61/640,493, filed on Apr. 30, 2012, provisional application No. 61/637,301, filed on Apr. 24, 2012, provisional application No. 61/635,156, filed on Apr. 18, 2012, provisional application No. 61/619,546, filed on Apr. 3, 2012, provisional application No. 61/611,505, filed on Mar. 15, 2012, provisional application No. 61/611,286, filed on Mar. 15, 2012, provisional application No. 61/606,913, filed on Mar. 5, 2012.

(51) Int. Cl.

| | |
|---|---|
| ***B41M 5/025*** | (2006.01) |
| ***B41M 5/03*** | (2006.01) |
| *B41N 10/00* | (2006.01) |

(56) References Cited

U.S. PATENT DOCUMENTS

| | | | | |
|---|---|---|---|---|
| 4,867,830 | A | 9/1989 | Chung | |
| 5,935,751 | A * | 8/1999 | Matsuoka | G03G 9/08782 430/137.19 |
| 6,709,096 | B1 * | 3/2004 | Beach | B41M 5/5218 347/103 |
| 7,419,257 | B2 | 9/2008 | Mouri et al. | |
| 8,362,108 | B2 | 1/2013 | Imai | |
| 8,632,147 | B2 | 1/2014 | Onishi | |
| 8,939,573 | B2 | 1/2015 | Kanasugi et al. | |
| 9,044,932 | B2 | 6/2015 | Ohnishi et al. | |
| 9,573,361 | B2 | 2/2017 | Tsuji et al. | |
| 9,969,182 | B2 | 5/2018 | Torisaka et al. | |
| 10,052,865 | B2 | 8/2018 | Goto | |
| 10,336,060 | B2 | 7/2019 | Liu | |
| 10,703,093 | B2 | 7/2020 | Karlinski et al. | |
| 11,559,982 | B2 | 1/2023 | Landa et al. | |
| 2004/0105971 | A1 | 6/2004 | Parrinello et al. | |
| 2004/0249327 | A1 | 12/2004 | Sendijarevic et al. | |
| 2005/0074260 | A1 * | 4/2005 | King | G03G 15/162 399/222 |
| 2005/0103437 | A1 | 5/2005 | Carroll | |
| 2005/0117859 | A1 | 6/2005 | Suzuki et al. | |
| 2006/0175559 | A1 | 8/2006 | Fischer et al. | |
| 2006/0284950 | A1 | 12/2006 | Kessler | |
| 2007/0025740 | A1 | 2/2007 | Katoh et al. | |
| 2007/0064077 | A1 * | 3/2007 | Konno | B41J 2/2114 347/102 |
| 2008/0066277 | A1 | 3/2008 | Colson et al. | |
| 2008/0101895 | A1 | 5/2008 | Holcomb et al. | |
| 2008/0247780 | A1 | 10/2008 | Hara | |
| 2008/0295724 | A1 | 12/2008 | Lohweg et al. | |
| 2009/0073222 | A1 | 3/2009 | Hori | |
| 2009/0080949 | A1 * | 3/2009 | Yamanobe | B41M 5/03 399/308 |
| 2010/0035501 | A1 | 2/2010 | Prudhomme et al. | |
| 2010/0123752 | A1 | 5/2010 | Eun et al. | |
| 2010/0225695 | A1 * | 9/2010 | Fujikura | B41J 11/00216 347/17 |
| 2011/0150541 | A1 * | 6/2011 | Michibata | G03G 15/161 399/313 |
| 2012/0014726 | A1 | 1/2012 | Sekihara et al. | |
| 2012/0183756 | A1 | 7/2012 | Higuchi | |
| 2012/0249630 | A1 | 10/2012 | Bugner et al. | |
| 2012/0280447 | A1 | 11/2012 | Kayanuma | |
| 2013/0016156 | A1 | 1/2013 | Ooishi et al. | |
| 2013/0229457 | A1 | 9/2013 | Yu | |
| 2013/0235139 | A1 | 9/2013 | Schnabel et al. | |
| 2014/0168313 | A1 | 6/2014 | Ramesh et al. | |
| 2014/0176641 | A1 * | 6/2014 | Hawryschuk | B41J 2/16505 347/32 |
| 2015/0097906 | A1 | 4/2015 | Beier et al. | |
| 2015/0273835 | A1 | 10/2015 | Arimizu et al. | |
| 2015/0343797 | A1 | 12/2015 | Song et al. | |
| 2015/0375543 | A1 | 12/2015 | Barnett et al. | |
| 2016/0083609 | A1 | 3/2016 | Sisler et al. | |
| 2016/0274519 | A1 | 9/2016 | Lim et al. | |
| 2017/0282599 | A1 | 10/2017 | Ido | |
| 2018/0037044 | A1 | 2/2018 | Stowe et al. | |
| 2018/0281382 | A1 | 10/2018 | Umezawa et al. | |
| 2019/0232638 | A1 | 8/2019 | Ziegenbalg et al. | |
| 2020/0073301 | A1 | 3/2020 | Sakai et al. | |
| 2020/0361715 | A1 | 11/2020 | Meier | |
| 2020/0376860 | A1 | 12/2020 | Paker et al. | |
| 2021/0055666 | A1 | 2/2021 | Landa et al. | |
| 2023/0001710 | A1 | 1/2023 | Landa et al. | |
| 2023/0037462 | A1 | 2/2023 | Burkatovsky | |
| 2023/0321972 | A1 | 10/2023 | Shmaiser et al. | |
| 2023/0364905 | A1 | 11/2023 | Landa et al. | |
| 2023/0382101 | A1 | 11/2023 | Landa et al. | |

FOREIGN PATENT DOCUMENTS

| | | | |
|---|---|---|---|
| CN | 102675962 | B | 6/2015 |
| CN | 105844621 | A | 8/2016 |
| CN | 107879147 | A | 4/2018 |
| DE | 102012011783 | A1 | 12/2013 |
| JP | S63274572 | A | 11/1988 |
| JP | H01142811 | A | 6/1989 |
| JP | H05249870 | A | 9/1993 |
| JP | H08272224 | A | 10/1996 |
| JP | H09174646 | A | 7/1997 |
| JP | 2000094660 | A | 4/2000 |
| JP | 2000337464 | A | 12/2000 |
| JP | 2003107819 | A | 4/2003 |
| JP | 2003227549 | A | 8/2003 |
| JP | 2004117118 | A | 4/2004 |
| JP | 2005224737 | A | 8/2005 |
| JP | 3712547 | B2 | 11/2005 |
| JP | 2006256087 | A | 9/2006 |
| JP | 2007111891 | A | 5/2007 |
| JP | 2009000916 | A | 1/2009 |
| JP | 2009154377 | A | 7/2009 |
| JP | 2009258587 | A | 11/2009 |
| JP | 2009279808 | A | 12/2009 |
| JP | 2010076214 | A | 4/2010 |
| JP | 2010100012 | A | 5/2010 |
| JP | 2012081770 | A | 4/2012 |
| JP | 2013199114 | A | 10/2013 |
| JP | 2016007841 | A | 1/2016 |
| JP | 2018017429 | A | 2/2018 |
| JP | 2018202867 | A | 12/2018 |
| JP | 2020014350 | A | 1/2020 |
| JP | 2021055093 | A | 4/2021 |
| WO | 2015036865 | A1 | 3/2015 |
| WO | 2017208152 | A1 | 12/2017 |
| WO | 2019012456 | A1 | 1/2019 |
| WO | 2019111223 | A1 | 6/2019 |

(56) References Cited

FOREIGN PATENT DOCUMENTS

| | | | |
|---|---|---|---|
| WO | 2020003088 | A1 | 1/2020 |
| WO | 2020136517 | A1 | 7/2020 |
| WO | 2020141465 | A1 | 7/2020 |
| WO | 2021137063 | A1 | 7/2021 |

OTHER PUBLICATIONS

CN102566343A Machine Translation (by EPO and Google)—published Jul. 11, 2012; Canon KK.
CN105844621A Machine Translation (by EPO and Google)—published Aug. 10, 2016; Fuyang Feiyang Printing Co Ltd.
CN107879147A Machine Translation (by EPO and Google)—published Apr. 6, 2018; Brother Ind Ltd.
Co-pending U.S. Appl. No. 18/016,343, inventors Levanon; Moshe et al., filed Jan. 15, 2023.
Co-pending U.S. Appl. No. 18/069,232, filed Dec. 21, 2022.
Co-pending U.S. Appl. No. 18/076,420, inventor Burkatovsky; Vitaly, filed Dec. 7, 2022.
DE102012011783A1 Machine Translation (by EPO, PlatPat and Google)—published Dec. 19, 2013; Heidelberger Druckmasch AG.
IP.com search (Year: 2022).
JP2000094660A Machine Translation (by EPO and Google)—published Apr. 4, 2000; Brother Ind Ltd.
JP2000337464A Machine Translation (by EPO and Google)—published Dec. 5, 2000; Fuji Xerox Co Ltd.
JP2003107819A Machine Translation (by EPO and Google)—published Apr. 9, 2003; Kanegafuchi Chemical Ind.
JP2003227549A Machine Translation (by EPO, PlatPat and Google)—published Aug. 15, 2003; Xerox Corp.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys Ltd.
JP2009154377A Machine Translation (by EPO and Google)—published Jul. 16, 2009; Fujifilm Corp.
JP2009258587A Machine Translation (by EPO and Google)—published Nov. 5, 2009; Fuji Xerox Co Ltd.
JP2009279808A Machine Translation (by EPO and Google)—published Dec. 3, 2009; Fuji Xerox Co Ltd.
JP2010076214A Machine Translation (EPO, PlatPat and Google) published on Apr. 8, 2010 Fuji Xerox Co Ltd.
JP2012081770A Machine Translation (EPO, PlatPat and Google) published on Apr. 26, 2012 Komori Printing Mach.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP3712547B2 Machine Translation (EPO, PlatPat and Google) published on Nov. 2, 2005 Sasaya Shunji.
JPH05249870A Machine Translation (by EPO, PlatPat and Google)—published Sep. 28, 1993; Matsushita Electric Ind Co Ltd.
JPH08272224A Machine Translation (by EPO, PlatPat and Google)—published Oct. 18, 1996; Ricoh KK.
JPH09174646A Machine Translation (by EPO and Google)—published Jul. 8, 1997; Kao Corp.
JPS63274572A Machine Translation (by EPO and Google)—published Nov. 11, 1988; Canon KK.
Co-pending U.S. Appl. No. 18/203,030, filed May 29, 2023.
Co-pending U.S. Appl. No. 18/545,483, filed Dec. 19, 2023.
JP2007111891A Machine Translation (by EPO and Google)—published May 10, 2007; Mitsubishi Heavy Ind Ltd.
JP2009000916A Machine Translation (by EPO and Google)—published Jan. 8, 2009; Fujifilm Corp.
JP2013199114A Machine Translation (by EPO and Google)—published Oct. 3, 2013; Canon KK.
JP2021055093A Machine Translation (by EPO and Google)—published Apr. 8, 2021; Riso Kagaku Corp.
JPH01142811A Machine Translation (by EPO and Google)—published Jun. 5, 1989; Fanuc Ltd.
CN102675962B Machine Translation (by EPO and Google)—published Jun. 17, 2015; Fuji Photo Film Co Ltd.
Co-pending U.S. Appl. No. 18/743,386, filed Jun. 14, 2024.
JP2010100012 Machine Translation (English machine translation)—published May 6, 2010 Fuji Xerox Co Ltd.
JP2016007841A Machine Translation (by EPO and Google)—published Jan. 18, 2016; Ricoh Co Ltd.
JP2018202867A Machine Translation (by EPO and Google)—published Dec. 27, 2018; Canon KK.

* cited by examiner

DIGITAL PRINTING PROCESS

CROSS-REFERENCE TO RELATED APPLICATIONS

This application is a continuation of U.S. patent application Ser. No. 17/184,411, filed on Feb. 24, 2021, which is incorporated herein by reference in its entirety. U.S. patent application Ser. No. 17/184,411 is a continuation of U.S. patent application Ser. No. 16/432,934, filed on Jun. 6, 2019, which is incorporated herein by reference in its entirety. U.S. patent application Ser. No. 16/432,934 This application is a continuation of U.S. patent application Ser. No. 15/708,151, filed on Sep. 9, 2017, which is incorporated herein by reference in its entirety. U.S. patent application Ser. No. 15/708,151 is a continuation of Ser. No. 15/175,275, filed on Jun. 7, 2016 which is incorporated herein by reference in its entirety. U.S. patent application Ser. No. 15/175,275 is a continuation of U.S. patent application Ser. No. 14/382,751, filed on Sep. 3, 2014 which is incorporated herein by reference in its entirety. U.S. patent application Ser. No. 14/382,751 is a 371 national phase filing of PCT/IB2013/051716 which (i) was filed on Mar. 5, 2013; (ii) published as WO/2013/132418 and (iii) is incorporated herein by reference in its entirety. The present application claims priority to the following United States provisional patent applications, all of which are hereby incorporated by reference herein in their entirety: U.S. Provisional Patent Application 61/640,642, filed Apr. 30, 2012; U.S. Provisional Patent Application 61/640,637, filed Apr. 30, 2012; U.S. Provisional Patent Application 61/640,493, filed Apr. 30, 2012; U.S. Provisional Patent Application 61/637,301, filed Apr. 24, 2012; U.S. Provisional Patent Application 61/635,156, filed Apr. 18, 2012; U.S. Provisional Patent Application 61/619,546, filed Apr. 3, 2012; U.S. Provisional Patent Application 61/611,505, filed Mar. 15, 2012; U.S. Provisional Patent Application 61/611,286, filed Mar. 15, 2012 and U.S. Provisional Patent Application 61/606,913, filed Mar. 5, 2012.

FIELD OF THE INVENTION

The present invention relates to a digital printing process.

BACKGROUND

Digital printing techniques have been developed that allow a printer to receive instructions directly from a computer without the need to prepare printing plates. Amongst these are color laser printers that use the xerographic process. Color laser printers using dry toners are suitable for certain applications, but they do not produce images of a photographic quality acceptable for publications, such as magazines.

A process that is better suited for short run high quality digital printing is used in the HP-Indigo printer. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto paper or any other substrate.

Inkjet and bubble jet processes are commonly used in home and office printers. In these processes droplets of ink are sprayed onto a final substrate in an image pattern. In general, the resolution of such processes is limited due to wicking by the inks into paper substrates. The substrate is therefore generally selected or tailored to suit the specific characteristics of the particular inkjet printing arrangement being used. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications, especially for commercial printing. Furthermore, the use of coated substrates creates its own problems in that the surface of the substrate remains wet and additional costly and time consuming steps are needed to dry the ink, so that it is not later smeared as the substrate is being handled, for example stacked or wound into a roll. Furthermore, excessive wetting of the substrate causes cockling and makes printing on both sides of the substrate (also termed perfecting or duplex printing) difficult, if not impossible.

Furthermore, inkjet printing directly onto porous paper, or other fibrous material, results in poor image quality because of variation of the distance between the print head and the surface of the substrate.

Using an indirect or offset printing technique overcomes many problems associated with inkjet printing directly onto the substrate. It allows the distance between the surface of the intermediate image transfer member and the inkjet print head to be maintained constant and reduces wetting of the substrate, as the ink can be dried on the intermediate image member before being applied to the substrate. Consequently, the final image quality on the substrate is less affected by the physical properties of the substrate.

The use of transfer members which receive ink droplets from an ink or bubble jet apparatus to form an ink image and transfer the image to a final substrate have been reported in the patent literature. Various ones of these systems utilize inks having aqueous carriers, non-aqueous carrier liquids or inks that have no carrier liquid at all (solid inks).

The use of aqueous based inks has a number of distinct advantages. Compared to non-aqueous based liquid inks, the carrier liquid is not toxic and there is no problem in dealing with the liquid that is evaporated as the image dries. As compared with solid inks, the amount of material that remains on the printed image can be controlled, allowing for thinner printed images and more vivid colors.

Generally, a substantial proportion or even all of the liquid is evaporated from the image on the intermediate transfer member, before the image is transferred to the final substrate in order to avoid bleeding of the image into the structure of the final substrate. Various methods are described in the literature for removing the liquid, including heating the image and a combination of coagulation of the image particles on the transfer member, followed by removal of the liquid by heating, air knife or other means.

Generally, silicone coated transfer members are preferred, since this facilitates transfer of the dried image to the final substrate. However, silicone is hydrophobic which causes the ink droplets to bead on the transfer member. This makes it more difficult to remove the water in the ink and also results in a small contact area between the droplet and the blanket that renders the ink image unstable during rapid movement.

Surfactants and salts have been used to reduce the surface tension of the droplets of ink so that they do not bead as much. While these do help to alleviate the problem partially, they do not solve it.

SUMMARY OF THE INVENTION

There is disclosed here a printing process which comprises directing droplets of an ink onto an intermediate transfer member to form an ink image, the ink including an organic polymeric resin and a coloring agent in an aqueous carrier, and the transfer member having a hydrophobic outer surface, each ink droplet in the ink image spreading on impinging upon the intermediate transfer member to form an ink film; drying the ink while the ink image is being transported by the intermediate transfer member by evaporating the aqueous carrier from the ink image to leave a residue film of resin and coloring agent; and transferring the residue film to a substrate, wherein the chemical compositions of the ink and of the surface of the intermediate transfer member are selected such that attractive intermolecular forces between molecules in the outer skin of each droplet and on the surface of the intermediate transfer member counteract the tendency of the ink film produced by each droplet to bead under the action of the surface tension of the aqueous carrier, without causing each droplet to spread by wetting the surface of the intermediate transfer member.

The verb "to bead" is used herein to describe the action of surface tension to cause a pancake or disk-like film to contract radially and increase in thickness so as to form a bead, that is to say a near-spherical globule.

The coloring agent may be a pigment, a dye or combinations thereof. In particular the coloring agents may be pigments having an average particle size $D_{50}$ of at least 10 nm and of at most 300 nm, however such range may vary for each ink color and in some embodiments the pigments may have a $D_{50}$ of at most 200 nm or of at most 100 nm.

A hydrophobic outer surface on the intermediate transfer member is desirable as it assists in the eventual transfer of the residue film to the substrate. Such a hydrophobic outer surface or release layer is however undesirable during ink image formation because bead-like ink droplets cannot be stably transported by a fast moving intermediate transfer member and because they result in a thicker film with less coverage of the surface of the substrate. The present invention sets out to preserve, or freeze, the thin pancake shape of each ink droplet, that is caused by the flattening of the ink droplet on impacting the surface of the intermediate transfer member, despite the hydrophobicity of the surface of the intermediate transfer member.

To achieve this objective, the invention relies on intermolecular forces between charged molecules in the ink and in the outer surface of the intermediate transfer member, these electrostatic interactions also being known as Van der Waals forces. The molecules in the ink and in the outer surface of the transfer member may be mutually chargeable, becoming oppositely charged upon interaction, a cross-polarization process also referred to as induction or they may be of opposite charge before such interaction.

The "work function" or "surface energy" is a measure of the ease with which electrons can be released from a surface. A conventional hydrophobic surface, such as a silicone coated surface, will yield electrons readily and is regarded as negatively charged. Polymeric resins in an aqueous carrier are likewise generally negatively charged. Therefore, in the absence of additional steps being taken the net intermolecular forces will cause the intermediate transfer member to repel the ink and the droplets will tend to bead into spherical globules.

In some embodiments of the invention, the chemical composition of the surface of the intermediate transfer member is modified to provide a positive charge. This may be achieved, for example, by including in the surface of the intermediate transfer member molecules having one or more Brønsted base functional groups and in particular nitrogen comprising molecules. Suitable positively charged or chargeable groups include primary amines, secondary amines, and tertiary amines. Such groups can be covalently bound to polymeric backbones and, for example, the outer surface of the intermediate transfer member may comprise amino silicones.

Such positively chargeable functional groups of the molecules of the release layer may interact with Brønsted acid functional groups of molecules of the ink. Suitable negatively charged or chargeable groups include carboxylated acids such as having carboxylic acid groups (—COOH), acrylic acid groups ($—CH_2═CH—COOH$), methacrylic acid groups ($—CH_2═C(CH_3)—COOH$) and sulfonates such as having sulfonic acid groups ($—SO_3H$). Such groups can be covalently bound to polymeric backbones and preferably be water soluble or dispersible. Suitable ink molecules may for example comprise acrylic-based resins such as an acrylic polymer and an acrylic-styrene copolymer having carboxylic acid functional groups.

Incorporating a compound into the transfer member to make the skin of each droplet reversibly attach to the surface of the intermediate transfer member has obvious advantages, but suitable compounds (e.g. amino silicones) that have been found to date, may have only a limited ability to withstand high operating temperatures, eventually shortening the lifespan of the transfer member, unless the printing process is modified to operate at lower temperatures or with shortened periods of high temperature.

An alternative for negating the repelling of the ink droplets by the negatively charged hydrophobic surface of the intermediate transfer member adopted in some embodiments of the invention is to apply a conditioning/treatment solution to the surface of the intermediate transfer member to reverse its polarity to positive. One can look upon such treatment of the intermediate transfer member as applying a very thin layer of a positive charge that is itself adsorbed into the surface of the intermediate transfer member but presents on its opposite side a net positive charge with which the negatively charged molecules in the ink may interact.

Chemical agents suitable for the preparation of such conditioning solutions have relatively high charge density and can be a polymer containing amine nitrogen atoms in a plurality of functional groups which need not be the same and can be combined (e.g. primary, secondary, tertiary amines or quaternary ammonium salts). Though macromolecules having a molecular weight from a few hundred to a few thousand can be suitable conditioning agents, it is believed that polymers having a high molecular weight of 10,000 g/mole or more are preferable. Suitable conditioning agents include guar hydroxylpropyltrimonium chloride, hydroxypropyl guar hydroxypropyl-trimonium chloride, linear or branched polyethylene imine, modified polyethylene imine, vinyl pyrrolidone dimethylaminopropyl methacrylamide copolymer, vinyl caprolactam dimethylaminopropyl methacrylamide hydroxyethyl methacrylate, quaternized vinyl pyrrolidone dimethylaminoethyl methacrylate copolymer, poly(diallyldimethyl-ammonium chloride), poly(4-vinylpyridine) and polyallylamine.

Chemical agents having a high charge density, such as polyethylenimine (PEI), have been found to be particularly effective in preventing the ink droplets from beading up after impacting the surface of the intermediate transfer member.

The chemical agent may be applied as a dilute, preferably aqueous, solution. The solution may be heated to evaporate the solvent prior to the ink image formation, whereby the ink droplets are directed onto a substantially dry surface.

It has been found experimentally that if a single droplet of a dilute PEI solution is dropped onto the hydrophobic surface and immediately blown away and evaporated by a stream of high pressure air, ink droplets will only thereafter adhere without beading up on the parts of the surface that have come into contact with the dilute PEI solution, even only for such a brief instant. As such application can only leave a layer having a thickness of a very few molecules (possibly only a monolayer), the interaction with ink cannot be a stoichiometric chemical one, having regard to the significant difference between the mass of the PEI layer and the mass of the ink droplets.

The amount of charge on the transfer member is too small to attract more than a small number of particles in the ink, so that, it is believed, the concentration and distribution of particles in the drop is not substantially changed. Moreover, the time period during which such interaction may take place is relatively short, being at most few seconds and generally less than one.

It has been found, surprisingly, that the intermolecular attraction has a profound effect on the shape of the droplets after they stabilize. To revert from a pancake or disk-like shape to a spherical globule, surface tension needs to peel the skin of the ink droplet away from the surface of the intermediate transfer member. The intermolecular forces however resist such separation of the skin of the droplet from the surface and the result is a relatively flat droplet of ink of greater extent than a droplet of the same volume deposited on the same surface without such conditioning. Furthermore, since in areas that are not reached by the droplet the effective hydrophobic nature of the transfer member is maintained, there is little or no spreading of the droplet above that achieved in the initial impact and the boundaries of the droplet are distinct; in other words there is no wetting by the ink droplets of the surface of the intermediate transfer member, thus resulting in droplets having a regular rounded outline.

Further details on conditioning solutions suitable for printing processes and systems according to the present invention are disclosed in co-pending PCT Application No. PCT/IB2013/000757 (Agent's reference LIP 12/001 PCT).

In some embodiments of the invention, the intermediate transfer member is a blanket of which the outer surface is the hydrophobic outer surface upon which the ink image is formed. It is however alternatively possible for the intermediate transfer member to be constructed as a drum.

In accordance with a feature of some embodiments of the invention, prior to transferring the residue film onto the substrate, the ink image is heated to a temperature at which the residue film of resin and coloring agent that remains after evaporation of the aqueous carrier is being softened. Softening of the polymeric resin may render it tacky and increases its ability to adhere to the substrate as compared to its previous ability to adhere to the transfer member.

The temperature of the tacky residue film on the intermediate transfer member may be higher than the temperature of the substrate, whereby the residue film cools during adhesion to the substrate.

By suitable selection of the thermo-rheological characteristics of the residue film the effect of the cooling may be to increase the cohesion of the residue film, whereby its cohesion exceeds its adhesion to the transfer member so that substantially all of the residue film is separated from the intermediate transfer member and impressed as a film onto the substrate. In this way, it is possible to ensure that the residue film is impressed on the substrate without significant modification to the area covered by the film nor to its thickness.

[This one sounds to me like the UV Nanography which Benny wishes to file separately]

Further disclosed herein are printing systems for implementing the method aspects of the invention.

Still further disclosed herein is a substrate printed using an aqueous based ink, wherein the printed image is formed by a plurality of ink dots and each ink dot is constituted by a film of substantially uniform thickness, the printed image overlying the outer surface of the substrate without penetrating beyond the surface roughness of the substrate. The average film thickness may not exceed 1500 nm, 1200 nm, 1000 nm, 800 nm and may be of 500 nanometers or less; and may be of at least 50 nm, at least 100 nm, or at least 150 nm.

In an embodiment of the invention, each ink dot in the image, that does not merge into an adjacent ink dot, has a regular rounded outline.

A feature of some embodiments of the invention is concerned with the composition of the ink. The ink preferably utilizes an aqueous carrier, which reduces safety concerns and pollution issues that occur with inks that utilize volatile hydrocarbon carrier. In general, the ink must have the physical properties that are needed to apply very small droplets close together on the transfer member. Other necessary characteristics of the ink will become clear in the discussion below of the process.

Other effects that may contribute to the shape of the droplet remaining in the flattened configuration are, quick heating of the droplets to increase their its viscosity, a barrier (a polymer coating or a conditioning agent) that reduces the hydrophobic effect of the silicone layer and a surfactant that reduces the surface tension of the ink.

In general, ink jet printers require a trade-off between purity of the color, the ability to produce complete coverage of a surface and the density of the ink-jet nozzles. If the droplets (after beading) are small, then, in order to achieve complete coverage, it is necessary to have the droplets close together. However, it is very problematic (and expensive) to have the droplets closer than the distance between pixels. By forming relatively flat droplet films that are held in place in the manner described above, the coverage caused by the droplets can be close to complete.

In an aspect of some embodiments of the invention, the carrier liquid in the image is evaporated from the image after it is formed on the transfer member. Since the coloring agent in the droplets is dispersed or dissolved within the droplet, the preferred method for removal of the liquid is by heating the image, either by heating the transfer member or by external heating of the image after it is formed on the transfer member, or by a combination of both.

In some embodiments of the invention, the carrier is evaporated by blowing a heated gas (e.g. air) over the surface of the transfer member.

In some embodiments, different ink colors are applied sequentially to the surface of the intermediate transfer member and a heated gas is blown onto the droplets of each ink color after their deposition but before deposition on the intermediate transfer member of the next ink color. In this way, merging of ink droplets of different colors with one another is reduced.

In a preferred embodiment of the invention, the polymeric resin in the ink is a polymer that forms a residue film when it is heated (the term residue film is used herein to refer to the ink droplets after they have been dried). Acrylic polymers and acrylic-styrene co-polymers with an average molecular weight around 60,000 g/mole have been found to be suitable. Further details of non-limiting examples of ink compositions suitable for the printing processes and systems of the present invention are disclosed in co-pending PCT Application No. PCT/IB2013/051755 (Agent's reference LIP 11/001 PCT).

Preferably all of the liquid is evaporated, however, a small amount of liquid, that does not interfere with the forming of a film may be present.

The formation of a residue film has a number of advantages. The first of these is that when the image is transferred to the final substrate all, or nearly all, of the image can be transferred. This allows for a system without a permanently engaged cleaning station for removing residues from the transfer member. Another more profound advantage is that it allows for the image to be attached to the substrate with a constant thickness of the image covering the substrate. Additionally, it prevents the penetration of the image beneath the surface of the substrate.

In general, when an image is transferred to or formed on a substrate, while it is still liquid, the image penetrates into the fibers of the substrate and beneath its surface. This causes uneven color and a reduction in the depth of the color, since some of the coloring agent is blocked by the fibers.

In accordance with a preferred embodiment of the invention, the residue film is very thin, preferably below 1500 nanometers, more preferably between 10 nm and 800 nm and most preferably between 50 nm and 500 nm. Such thin films are transferred intact to the substrate and, because they are so thin, replicate the surface of the substrate by closely following its contours. This results in a much smaller difference in the gloss of the substrate between printed and non-printed areas.

When the residue film reaches an impression station at which it is transferred from the intermediate transfer member to the final substrate, it is pressed against the substrate, having preferably previously been heated to a temperature at which it becomes tacky in order to attach itself to the substrate.

Preferably, the substrate, which is generally not heated, cools the image so that it solidifies and transfers to the substrate without leaving any of residue film on the surface of the intermediate transfer member. For this cooling to be effective, additional constraints are placed on the polymer in the ink.

The fact that the carrier is termed an aqueous carrier is not intended to preclude the presence of certain organic materials in the ink, in particular, certain innocuous water miscible organic material and/or co-solvents, however, substantially all of the volatile material in the ink is preferably water.

As the outer surface of the intermediate transfer member is hydrophobic, and therefore not water absorbent, there may be substantially no swelling, which was found to distort the surface of transfer members in commercially available products utilizing silicone coated transfer members and hydrocarbon carrier liquids. Consequently, the process described above may achieve a highly smooth release surface, as compared to intermediate transfer member surfaces of the prior art.

As the image transfer surface is hydrophobic, and therefore not water absorbent, substantially all the water in the ink should be evaporated away if wetting of the substrate is to be avoided.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

General Overview

Figure 1:
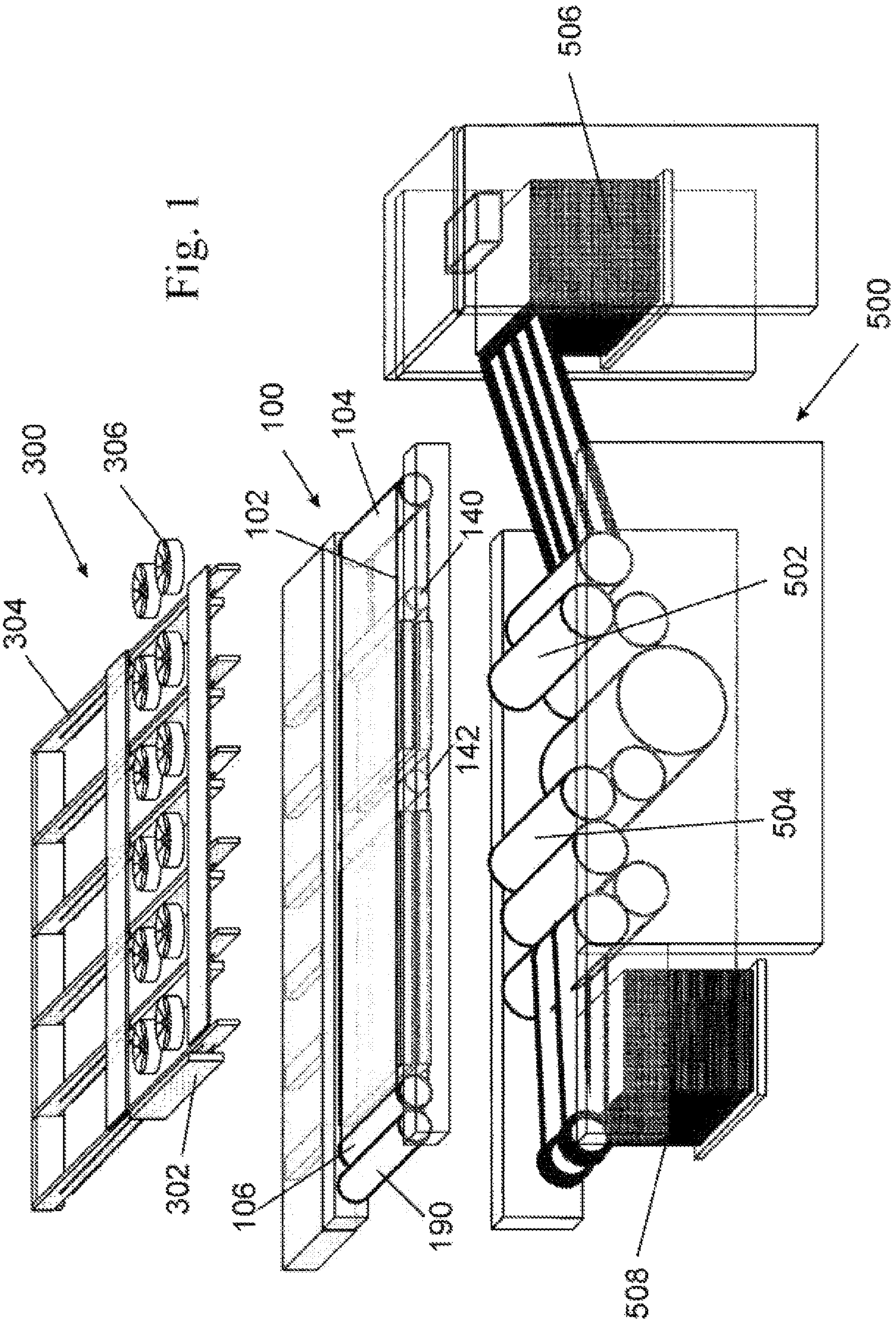
FIG. 1 is an exploded schematic perspective view of a printer in accordance with an embodiment of the invention.

The printer shown in FIGS. 1 and 2 essentially comprises three separate and mutually interacting systems, namely a blanket system 100, an image forming system 300 above the blanket system 100 and a substrate transport system 500 below the blanket system 100.

The blanket system 100 comprises an endless belt or blanket 102 that acts as an intermediate transfer member and is guided over two rollers 104, 106. An image made up of dots of an aqueous ink is applied by image forming system 300 to an upper run of blanket 102 at a location referred herein as the image forming station. A lower run selectively interacts at two impression stations with two impression cylinders 502 and 504 of the substrate transport system 500 to impress an image onto a substrate compressed between the blanket 102 and the respective impression cylinder 502, 504 by the action of respective pressure or nip rollers 140, 142. As will be explained below, the purpose of there being two impression cylinders 502, 504 is to permit duplex printing. In the case of a simplex printer, only one impression station would be needed. The printer shown in FIGS. 1 and 2 can print single sided prints at twice the speed of printing double sided prints. In addition, mixed lots of single and double sided prints can also be printed.

In operation, ink images, each of which is a mirror image of an image to be impressed on a final substrate, are printed by the image forming system 300 onto an upper run of blanket 102. In this context, the term "run" is used to mean a length or segment of the blanket between any two given rollers over which the blanket is guided. While being transported by the blanket 102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 502, 504 the image is impressed onto individual sheets 501 of a substrate which are conveyed by the substrate transport system 500 from an input stack 506 to an output stack 508 via the impression cylinders 502, 504.

Though not shown in the figures, the blanket system may further comprise a cleaning station which may be used periodically to "refresh" the blanket or in between printing jobs. The cleaning station may comprise one or more devices configured to remove gently any residual ink images or any other trace particle from the release layer. In one embodiment, the cleaning station may comprise a device configured to apply a cleaning fluid to the surface of the transfer member, for example a roller having cleaning liquid on its circumference, which preferably should be replaceable (e.g. a pad or piece of paper). Residual particles may optionally be further removed by an absorbent roller or by one or more scraper blades.

Image Forming System

Figure 5:
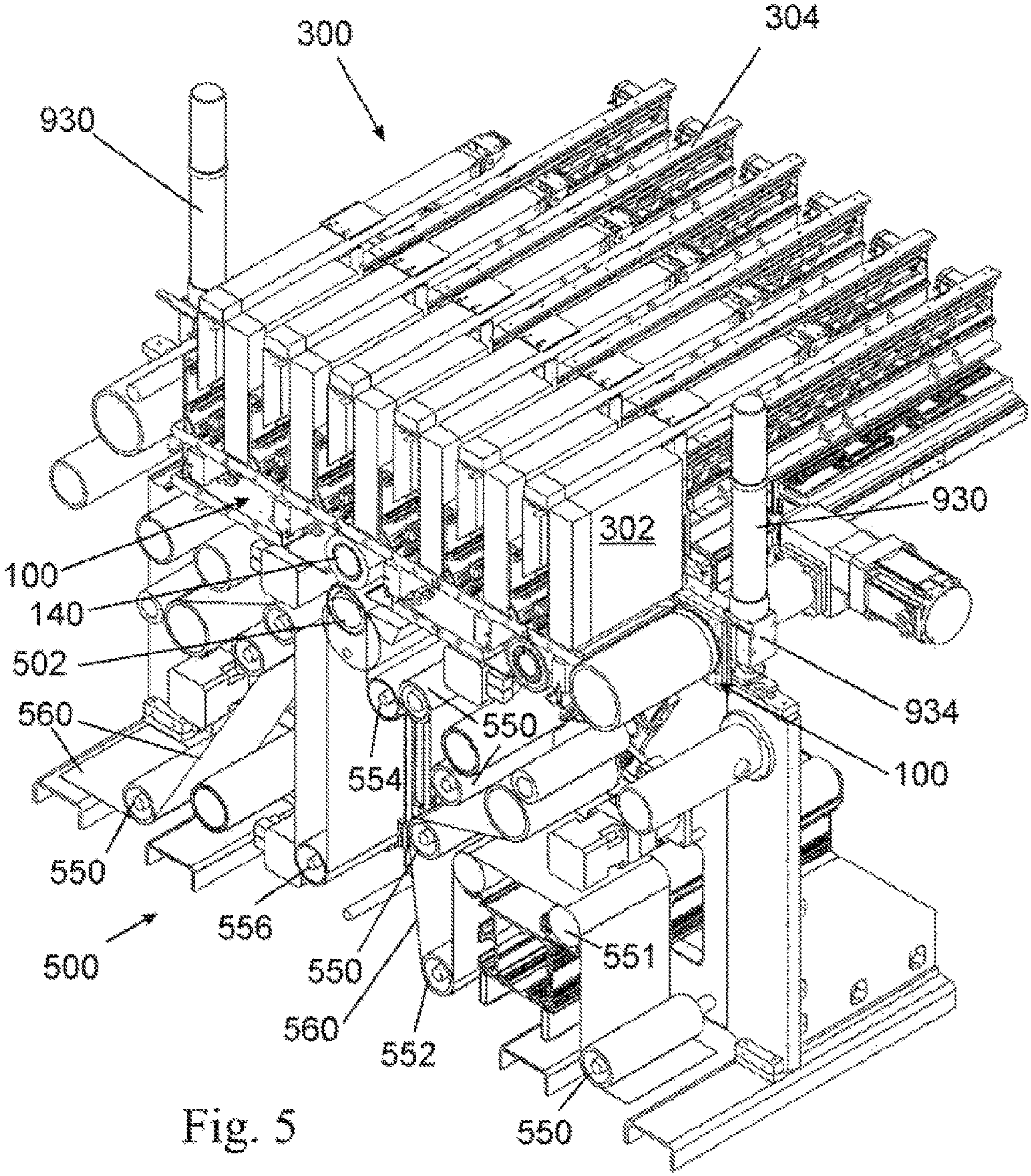
FIG. 5 is a schematic perspective view of a printer for printing on a continuous web of the substrate, in accordance with an embodiment of the invention.

As best shown in FIG. 5, the image forming system 300 comprises print bars 302 each slidably mounted on a frame 304 positioned at a fixed height above the surface of the blanket 102. Each print bar 302 may comprise a strip of print heads as wide as the printing area on the blanket 102 and comprises individually controllable print nozzles. The image forming system can have any number of bars 302, each of which may contain an aqueous ink of a different color.

As some print bars may not be required during a particular printing job, the heads can be moved between an operative position, in which they overlie blanket 102 and an inoperative position. A mechanism is provided for moving print bars 302 between their operative and inoperative positions but the mechanism is not illustrated and need not be described herein as it is not relevant to the printing process. It should be noted that the bars remain stationary during printing.

When moved to their inoperative position, the print bars are covered for protection and to prevent the nozzles of the print bar from drying or clogging. In an embodiment of the invention, the print bars are parked above a liquid bath (not shown) that assists in this task. In another embodiment, the print heads are cleaned, for example by removing residual ink deposit that may form surrounding the nozzle rims. Such maintenance of the print heads can be achieved by any suitable method, ranging from contact wiping of the nozzle plate to distant spraying of a cleaning solution toward the nozzles and elimination of the cleansed ink deposits by positive or negative air pressure. Print bars that are in the inoperative position can be changed and accessed readily for maintenance, even while a printing job is in progress using other print bars.

Within each print bar, the ink may be constantly recirculated, filtered, degassed and maintained at a desired temperature and pressure. As the design of the print bars may be conventional, or at least similar to print bars used in other inkjet printing applications, their construction and operation will be clear to the person skilled in the art without the need for more detailed description.

As different print bars 302 are spaced from one another along the length of the blanket, it is of course essential for their operation to be correctly synchronized with the movement of blanket 102.

If desired, as will be described below in connection with the embodiment of the invention shown in FIG. 9, it is possible to provide a blower following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction and preventing their movement on the intermediate transfer member, and also in preventing them from merging into droplets deposited subsequently by other print bars 302.

Blanket and Blanket Support System

The blanket 102, in one embodiment of the invention, is seamed. In particular, the blanket is formed of an initially flat strip of which the ends are fastened to one another, releasably or permanently, to form a continuous loop. A releasable fastening may be a zip fastener or a hook and loop fastener that lies substantially parallel to the axes of rollers 104 and 106 over which the blanket is guided. A permanent fastening may be achieved by the use of an adhesive or a tape.

In order to avoid a sudden change in the tension of the blanket as the seam passes over these rollers, it is desirable to make the seam, as nearly as possible, of the same thickness as the remainder of the blanket. It is also possible to incline the seam relative to the axis of the rollers but this would be at the expense of enlarging the non-printable image area.

Alternatively, the blanket can be seamless, hence relaxing certain constraints from the printing system (e.g. synchronization of seam's position). Whether seamless or not, the primary purpose of the blanket is to receive an ink image from the image forming system and to transfer that image dried but undisturbed to the impression stations. To allow easy transfer of the ink image at each impression station, the blanket has a thin upper release layer that is hydrophobic. The outer surface of the transfer member upon which the ink can be applied may comprise a silicone material. Under suitable conditions, a silanol-, sylyl- or silane-modified or terminated polydialkylsiloxane silicone material and amino silicones have been found to work well. However the exact formulation of the silicone is not critical as long as the selected material allows for release of the image from the transfer member to a final substrate. Further details of non-limiting examples of release layers and intermediate transfer members are disclosed in co-pending PCT Applications No. PCT/IB2013/051743 (Agent's reference LIP 10/002 PCT) and No. PCT/IB2013/051751 (Agent's reference LIP 10/005 PCT). Suitably, the materials forming the release layer allow it to be not absorbent.

In some embodiments, the silanol-terminated polydialkylsiloxane silicone may have the formula:

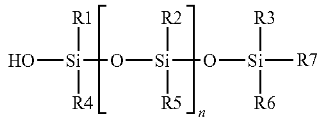

where R1 to R6 are each independently a saturated or unsaturated, linear, branched or cyclic $C_1$ to $C_6$ alkyl group; R7 is selected from the group consisting of OH, H or a saturated or unsaturated, linear, branched or cyclic $C_1$ to $C_6$ alkyl group; and n is an integer from 50 to 400.

The curable silicone may be cured by condensation curing.

Preferably, the material of the release layer is selected so that the transfer member does not swell (or is not solvated) by the carrier liquid of the ink or of any other fluid that may be applied to its outer surface. In some embodiments, the swelling of the release layer is of at most 1.5% by weight or of at most 1%, the swelling being assessed for 20 hours at 100° C.

The strength of the blanket can be derived from a support or reinforcement layer. In one embodiment, the reinforcement layer is formed of a fabric. If the fabric is woven, the warp and weft threads of the fabric may have a different composition or physical structure so that the blanket should have, for reasons to be discussed below, greater elasticity in its width ways direction (parallel to the axes of the rollers 104 and 106) than in its lengthways direction, in which it is preferably substantially non-extendible. In one embodiment, the fibers of the reinforcement layer in the longitudinal direction are substantially aligned with the printing direction and are made of high performance fibers (e.g. aramid, carbon, ceramic, glass fibers etc.).

The blanket may comprise additional layers between the reinforcement layer and the release layer, for example to provide conformability and compressibility of the release layer to the surface of the substrate. Other layers provided on the blanket may act as a thermal reservoir or a thermal partial barrier and/or to allow an electrostatic charge to the applied to the release layer. An inner layer may further be provided to control the frictional drag on the blanket as it is rotated over its support structure. Other layers may be included to adhere or connect the afore-mentioned layers one with another or to prevent migration of molecules therebetween.

Figure 3:
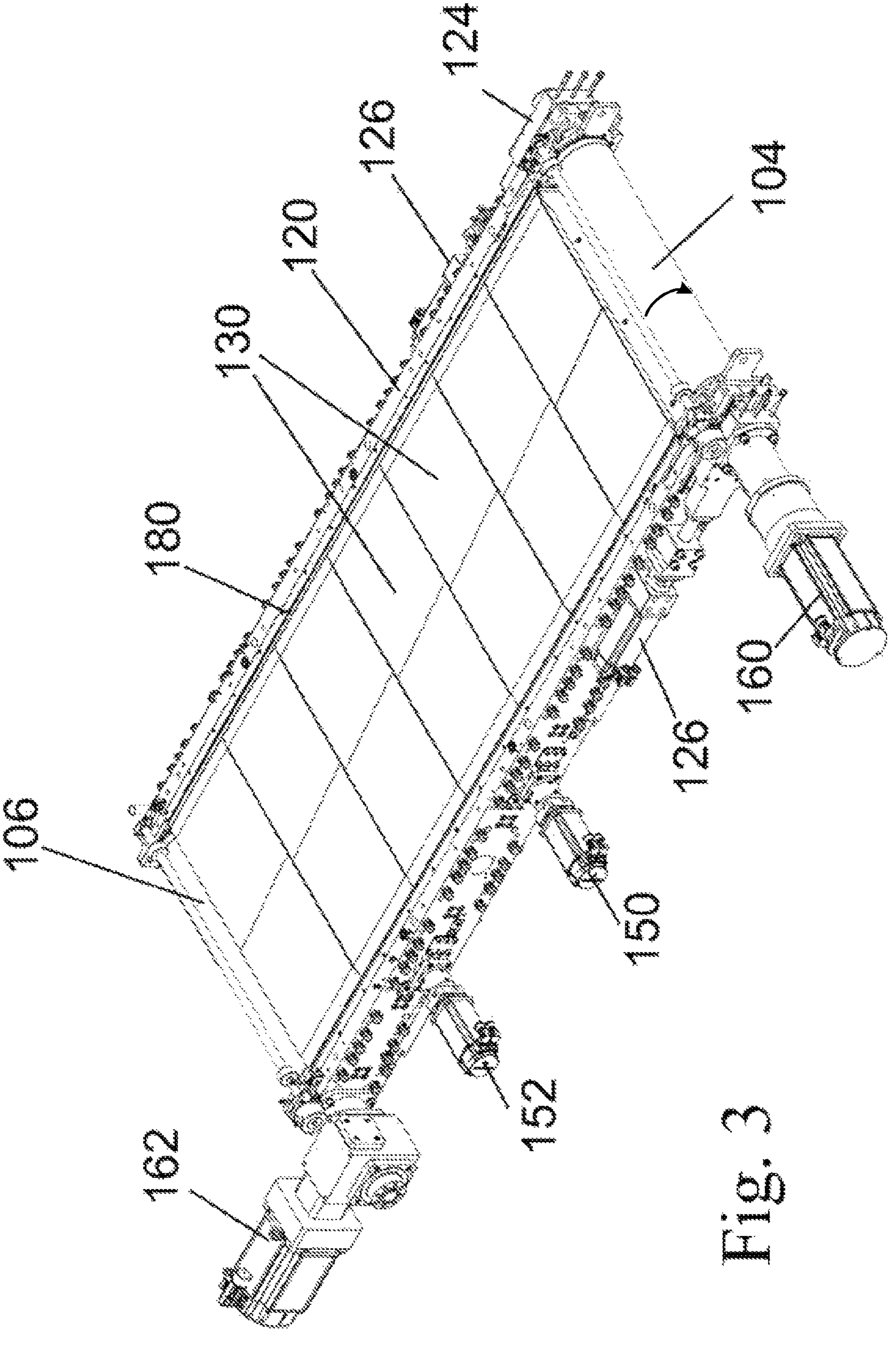
FIG. 3 is a perspective view of a blanket support system, in accordance with an embodiment of the invention, with the blanket removed.
Figure 4:
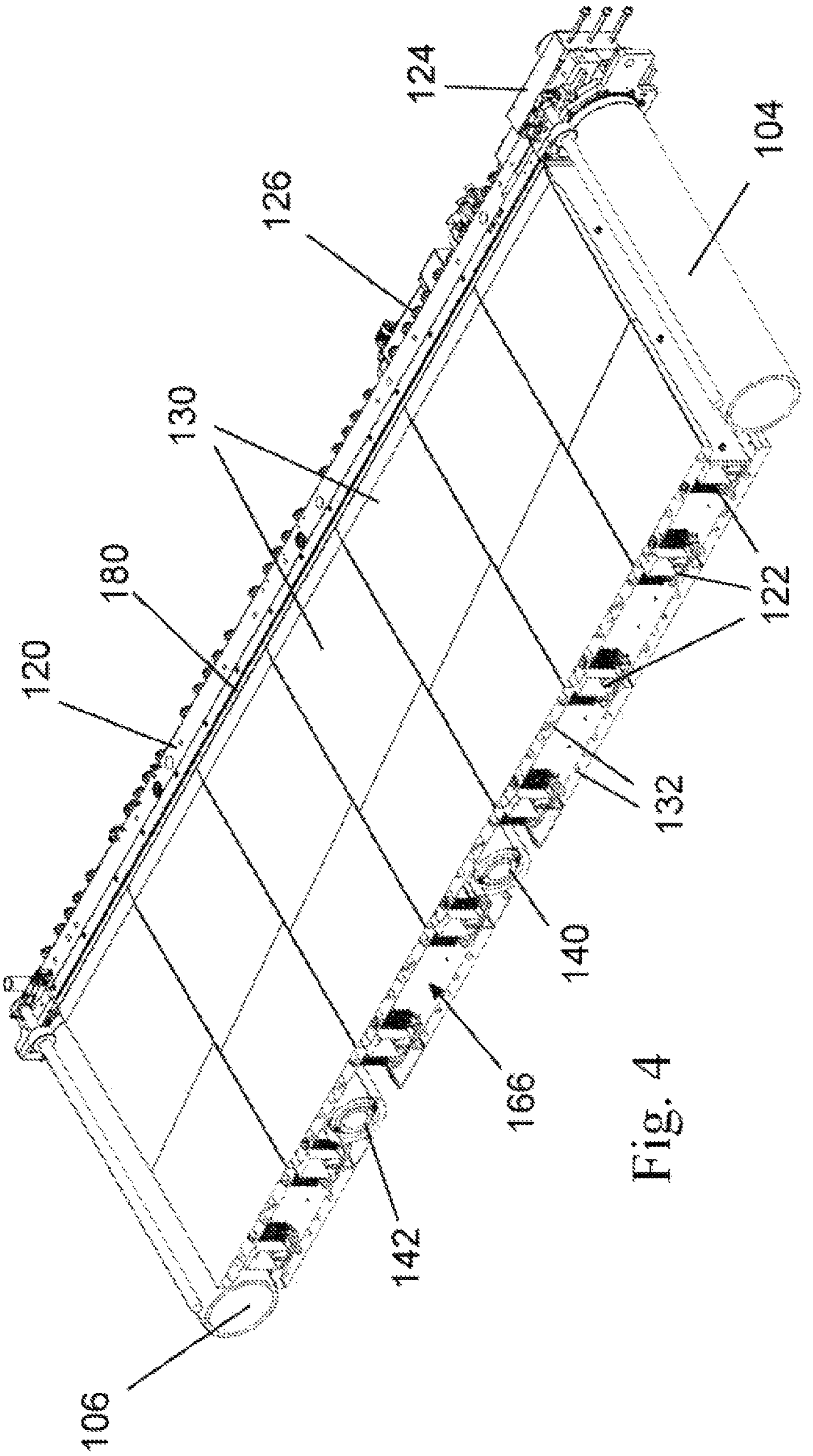
FIG. 4 shows a section through the blanket support system of FIG. 3 showing its internal construction.

The structure supporting the blanket in the embodiment of FIG. 1 is shown in FIGS. 3 and 4. Two elongate outriggers 120 are interconnected by a plurality of cross beams 122 to form a horizontal ladder-like frame on which the remaining components are mounted.

The roller 106 is journalled in bearings that are directly mounted on outriggers 120. At the opposite end, however, roller 104 is journalled in pillow blocks 124 that are guided for sliding movement relative to outriggers 120. Motors 126, for example electric motors, which may be stepper motors, act through suitable gearboxes to move the pillow blocks 124, so as to alter the distance between the axes of rollers 104 and 106, while maintaining them parallel to one another.

Thermally conductive support plates 130 are mounted on cross beams 122 to form a continuous flat support surface both on the top side and bottom side of the support frame. The junctions between the individual support plates 130 are intentionally offset from each other (e.g., zigzagged) in order to avoid creating a line running parallel to the length of the blanket 102. Electrical heating elements 132 are inserted into transverse holes in plates 130 to apply heat to the plates 130 and through plates 130 to the upper run of blanket 102. Other means for heating the upper run will occur to the person of skill in the art and may include heating from below, above, or within the blanket itself. The heating plates may also serve to heat the lower run of the blanket at least until transfer takes place.

Also mounted on the blanket support frame are two pressure or nip rollers 140, 142. The pressure rollers are located on the underside of the support frame in gaps between the support plates 130 covering the underside of the frame. The pressure rollers 140, 142 are aligned respectively with the impression cylinders 502, 504 of the substrate transport system, as shown most clearly in FIGS. 2 and 5. Each impression cylinder and corresponding pressure roller, when engaged as described below, form an impression station.

Each of the pressure rollers 140, 142 is preferably mounted so that it can be raised and lowered from the lower run of the blanket. In one embodiment each pressure roller is mounted on an eccentric that is rotatable by a respective actuator 150, 152. When it is raised by its actuator to an upper position within the support frame, each pressure roller is spaced from the opposing impression cylinder, allowing the blanket to pass by the impression cylinder while making contact with neither the impression cylinder itself nor with a substrate carried by the impression cylinder. On the other hand, when moved downwards by its actuator, each pressure roller 140, 142 projects downwards beyond the plane of the adjacent support plates 130 and deflects part of the blanket 102, forcing it against the opposing impression cylinder 502, 504. In this lower position, it presses the lower run of the blanket against a final substrate being carried on the impression roller (or the web of substrate in the embodiment of FIG. 5).

The rollers 104 and 106 are connected to respective electric motors 160, 162. The motor 160 is more powerful and serves to drive the blanket clockwise as viewed in FIGS. 3 and 4. The motor 162 provides a torque reaction and can be used to regulate the tension in the upper run of the blanket. The motors may operate at the same speed in an embodiment in which the same tension is maintained in the upper and lower runs of the blanket.

In an alternative embodiment of the invention, the motors 160 and 162 are operated in such a manner as to maintain a higher tension in the upper run of the blanket where the ink image is formed and a lower tension in the lower run of the blanket. The lower tension in the lower run may assist in absorbing sudden perturbations caused by the abrupt engagement and disengagement of the blanket 102 with the impression cylinders 502 and 504.

It should be understood that in an embodiment of the invention, pressure rollers 140 and 142 can be independently lowered and raised such that both, either or only one of the rollers is in the lower position engaging with its respective impression cylinder and the blanket passing therebetween.

In an embodiment of the invention, a fan or air blower (not shown) is mounted on the frame to maintain a sub-atmospheric pressure in the volume 166 bounded by the blanket and its support frame. The negative pressure serves to maintain the blanket flat against the support plates 130 on both the upper and the lower side of the frame, in order to achieve good thermal contact. If the lower run of the blanket is set to be relatively slack, the negative pressure would also assist in maintaining the blanket out of contact with the impression cylinders when the pressure rollers 140, 142 are not actuated.

In an embodiment of the invention, each of the outriggers 120 also supports a continuous track 180, which engages formations on the side edges of the blanket to maintain the blanket taut in its width ways direction. The formations may be spaced projections, such as the teeth of one half of a zip fastener sewn or otherwise attached to the side edge of the blanket. Alternatively, the formations may be a continuous flexible bead of greater thickness than the blanket. The lateral track guide channel may have any cross-section suitable to receive and retain the blanket lateral formations and maintain it taut. To reduce friction, the guide channel may have rolling bearing elements to retain the projections or the beads within the channel.

To mount a blanket on its support frame, according to one embodiment of the invention, entry points are provided along tracks 180. One end of the blanket is stretched laterally and the formations on its edges are inserted into tracks 180 through the entry points. Using a suitable implement that engages the formations on the edges of the blanket, the blanket is advanced along tracks 180 until it encircles the support frame. The ends of the blanket are then fastened to one another to form an endless loop or belt. Rollers 104 and 106 can then be moved apart to tension the blanket and stretch it to the desired length. Sections of tracks 180 are telescopically collapsible to permit the length of the track to vary as the distance between rollers 104 and 106 is varied.

In one embodiment, the ends of the blanket elongated strip are advantageously shaped to facilitate guiding of the blanket through the lateral tracks or channels during installation. Initial guiding of the blanket into position may be done for instance by securing the leading edge of the blanket strip introduced first in between the lateral channels 180 to a cable which can be manually or automatically moved to install the belt. For example, one or both lateral ends of the blanket leading edge can be releasably attached to a cable residing within each channel. Advancing the cable(s) advances the blanket along the channel path. Alternatively or additionally, the edge of the belt in the area ultimately forming the seam when both edges are secured one to the other can have lower flexibility than in the areas other than the seam. This local "rigidity" may ease the insertion of the lateral projections of the blanket into their respective channels.

Following installation, the blanket strip may be adhered edge to edge to form a continuous belt loop by soldering, gluing, taping (e.g. using Kapton® tape, RTV liquid adhesives or PTFE thermoplastic adhesives with a connective strip overlapping both edges of the strip), or any other method commonly known. Any method of joining the ends of the belt may cause a discontinuity, referred to herein as a seam, and it is desirable to avoid an increase in the thickness or discontinuity of chemical and/or mechanical properties of the belt at the seam.

Further details of non-limiting examples of formations suitable for blankets or belts that may be used in the printing systems of the present invention, as well as of methods for installing the same, are disclosed in co-pending PCT Application No. PCT/IB2013/051719 (Agent's reference LIP 7/005 PCT).

In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. In an embodiment of the invention, the blanket is marked at or near its edge with one or more markings spaced in the direction of motion of the blanket. One or more sensors 107 sense the timing of these markings as they pass the sensor. The speed of the blanket and the speed of the surface of the impression rollers should be the same, for proper transfer of the images to the substrate from the transfer blanket. Signals from the sensor(s) 107 are sent to a controller 109 which also receives an indication of the speed of rotation and angular position of the impression rollers, for example from encoders on the axis of one or both of the impression rollers (not shown). Sensor 107, or another sensor (not shown) also determines the time at which the seam of the blanket passes the sensor. For maximum utility of the usable length of the blanket, it is desirable that the images on the blanket start as close to the seam as feasible.

The controller controls the electric motors 160 and 162 to ensure that the linear speed of the blanket is the same as the speed of the surface of the impression rollers.

Because the blanket contains an unusable area resulting from the seam, it is important to ensure that this area always remain in the same position relative to the printed images in consecutive cycles of the blanket. Also, it is preferable to ensure that whenever the seam passes the impression cylinder, it should always coincides with a time when a discontinuity in the surface of the impression cylinder (accommodating the substrate grippers to be described below) faces pressure blanket.

Preferably, the length of the blanket is set to be a whole number multiple of the circumference of the impression cylinders 502, 504. In embodiments wherein the impression cylinder may accommodate two sheets of substrate, the length of the blanket may be a whole multiple of half the circumference of an impression cylinder. Since the length of the blanket 102 changes with time, the position of the seam relative to the impression rollers is preferably changed, by momentarily changing the speed of the blanket. When synchronism is again achieved, the speed of the blanket is again adjusted to match that of the impression rollers, when it is not engaged with the impression cylinders 502, 504. The length of the blanket can be determined from a shaft encoder measuring the rotation of one of rollers 104, 106 during one sensed complete revolution of the blanket.

The controller also controls the timing of the flow of data to the print bars and may control proper timing of any optional sub-system of the printing system, as known to persons skilled in the art of printing.

This control of speed, position and data flow ensures synchronization between image forming system 300, substrate transport system 500 and blanket system 100 and ensures that the images are formed at the correct position on the blanket for proper positioning on the final substrate. The position of the blanket is monitored by means of markings on the surface of the blanket that are detected by multiple sensors 107 mounted at different positions along the length of the blanket. The output signals of these sensors are used to indicate the position of the image transfer surface to the print bars. Analysis of the output signals of the sensors 107 is further used to control the speed of the motors 160 and 162 to match that to the impression cylinders 502, 504.

As its length is a factor in synchronization, the blanket is required to resist stretching and creep. In the transverse direction, on the other hand, it is only required to maintain the blanket flat taut without creating excessive drag due to friction with the support plates 130. It is for this reason that, in an embodiment of the invention, the elasticity of the blanket is intentionally made anisotropic.

Blanket Pre-Treatment

FIG. 1 shows schematically a roller 190 positioned externally to the blanket immediately before roller 106, according to an embodiment of the invention. Such a roller 190 may be used optionally to apply a thin film of pre-treatment solution containing a chemical agent, for example a dilute solution of a charged polymer, to the surface of the blanket. The film is preferably, totally dried by the time it reaches the print bars of the image forming system, to leave behind a very thin layer on the surface of the blanket that assists the ink droplets to retain their film-like shape after they have impacted the surface of the blanket.

While a roller can be used to apply an even film, in an alternative embodiment the pre-treatment or conditioning material is sprayed onto the surface of the blanket and spread more evenly, for example by the application of a jet from an air knife, a drizzle from sprinkles or undulations from a fountain. The pre-treatment solution may be removed from the transfer member shortly following its exposure thereto (e.g. by wiping or using an air flow). Independently of the method used to apply the optional conditioning solution, if needed, the location at which such pre-print treatment can be performed may be referred herein as the conditioning station.

The purpose of the applied chemical agent is to counteract the effect of the surface tension of the aqueous ink upon contact with the hydrophobic release layer of the blanket. It is believed that such pre-treatment chemical agents, for instance some charged polymers, such as polyethylenimine, will bond (temporarily at least), with the silicone surface of the transfer member to form a positively charged layer. However, the amount of charge that is present in such layer is believed to be much smaller than that in the droplet itself. The present inventors have found that a very thin layer, perhaps even a layer of molecular thickness will be adequate. This layer of pre-treatment of the transfer member may be applied in very dilute form of the suitable chemical agents. Ultimately this thin layer may be transferred onto the substrate, along with the image being impressed.

When the droplet impinges on the transfer member, the momentum in the droplet causes it to spread into a relatively flat volume. In the prior art, this flattening of the droplet is almost immediately counteracted by the combination of surface tension of the droplet and the hydrophobic nature of the surface of the transfer member.

In embodiment of the invention, the shape of the ink droplet is “frozen” such that at least some and preferably a major part of the flattening and horizontal extension of the droplet present on impact is preserved. It should be understood that since the recovery of the droplet shape after impact is very fast, the methods of the prior art would not effect phase change by agglomeration and/or coagulation and/or migration.

It is believed that, on impact, the positive charges on the transfer member attract the negatively charged polymer particles of the ink droplet that are immediately adjacent to the surface of the member. As the droplet spreads, this effect takes place along the entire interface between the spread droplet and the transfer member.

The amount of charge is too small to attract more than a small number of particles, so that, it is believed, the concentration and distribution of particles in the drop is not substantially changed. Furthermore, since the ink is aqueous, the effects of the positive charge are very local, especially in the very short time span needed for freezing the shape of the droplets.

While the applicants have found that coating the intermediate transfer member with a polymer utilizing a roller is an effective method for freezing the droplets, it is believed that spraying or otherwise chemically transferring positive charge to the intermediate transfer member is also possible, although this is a much more complex process.

In alternative embodiments of the invention, the tendency for the ink droplets to contract is counteracted by suitable selection of the chemical composition of one or other of the ink and the release layer on the blanket so as to establish attractive intermolecular forces that serve to resist the peeling away of the skin of the droplets from the surface of the release layer.

The average thickness of the elective pre-treatment solution may vary between initial application, optional removal and dried stage and is typically below 1000 nanometers, below 800 nm, below 600 nm, below 400 nm, below 200 nm, below 100 nm, below 50 nm, below 20 nm, below 10 nm, below 5 nm, or below 2 nm.

Ink Image Heating

The heaters 132 inserted into the support plates 130 are used to heat the blanket to a temperature that is appropriate for the rapid evaporation of the ink carrier and compatible with the composition of the blanket. For blankets comprising for instance silanol-, sylyl- or silane-modified or terminated polydialkylsiloxane silicones in the release layer, heating is typically of the order of 150° C., though this temperature may vary within a range from 120° C. to 180° C., depending on various factors such as the composition of the inks and/or of the conditioning solutions if needed. Blankets comprising amino silicones may generally be heated to temperatures between 70° C. and 130° C. When using the illustrated beneath heating of the transfer member, it is desirable for the blanket to have relatively high thermal capacity and low thermal conductivity, so that the temperature of the body of the blanket 102 will not change significantly as it moves between the optional pre-treatment or conditioning station, the image forming station and the impression station(s). To apply heat at different rates to the ink image carried by the transfer surface, external heaters or energy sources (not shown) may be used to apply additional energy locally, for example prior to reaching the impression stations to render the ink residue tacky, prior to the image forming station to dry the conditioning agent if necessary and at the image forming station to start evaporating the carrier from the ink droplets as soon as possible after they impact the surface of the blanket.

The external heaters may be, for example, hot gas or air blowers 306 (as represented schematically in FIG. 1) or radiant heaters focusing, for example, infra red radiation onto the surface of the blanket, which may attain temperatures in excess of 175° C., 190° C., 200° C., 210° C., or even 220° C.

If the ink contains components sensitive to ultraviolet light then an ultraviolet source may be used to help cure the ink as it is being transported by the blanket.

Substrate Transport Systems

Figure 2:
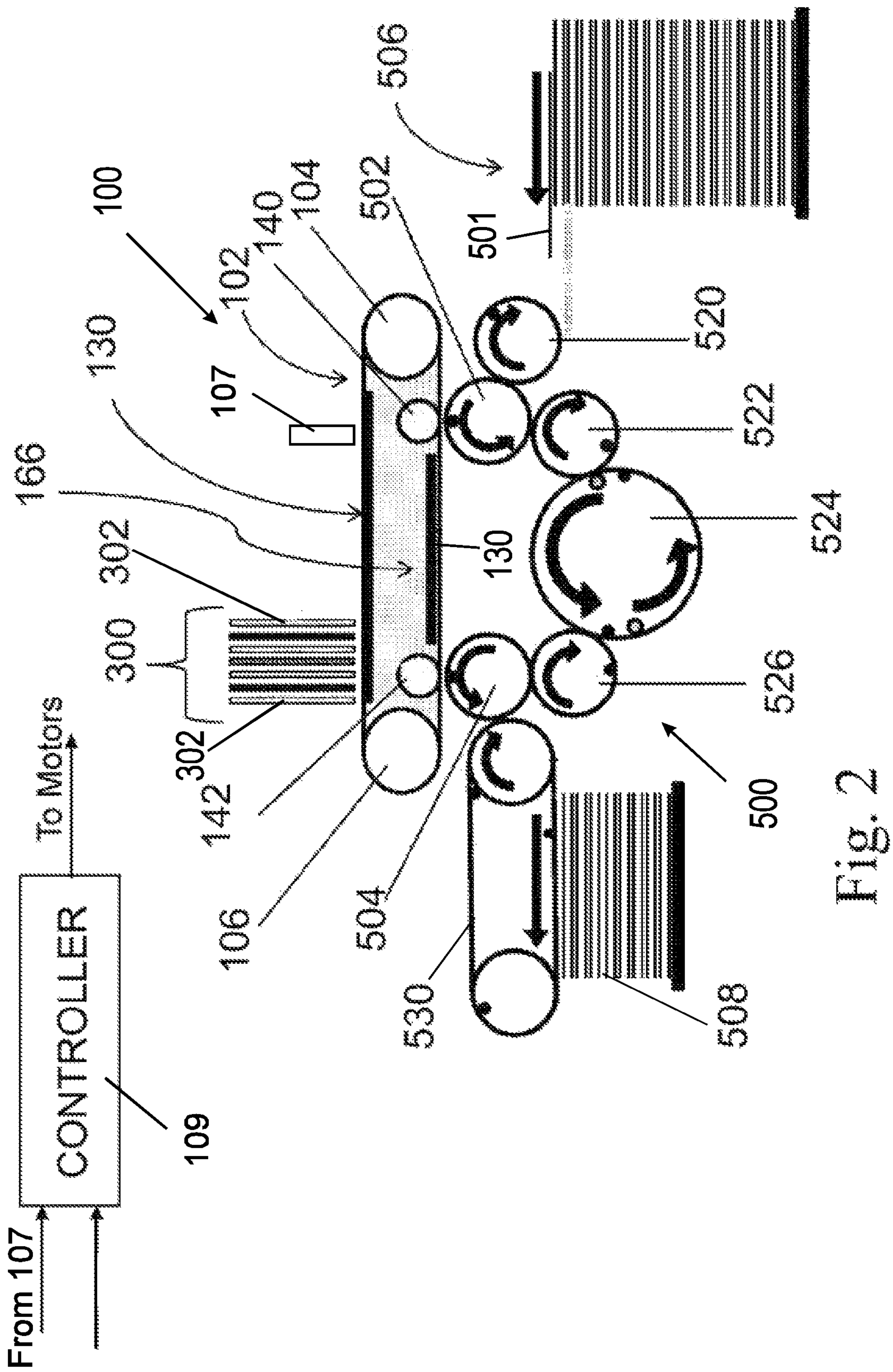
FIG. 2 is a schematic vertical section through the printer of FIG. 1, in which the various components of the printer are not drawn to scale.

The substrate transport may be designed as in the case of the embodiment of FIGS. 1 and 2 to transport individual sheets of substrate to the impression stations or, as is shown in FIG. 5, to transport a continuous web of the substrate.

In the case of FIGS. 1 and 2, individual sheets are advanced, for example by a reciprocating arm, from the top of an input stack 506 to a first transport roller 520 that feeds the sheet to the first impression cylinder 502.

Though not shown in the drawings, but known per se, the various transport rollers and impression cylinders may incorporate grippers that are cam operated to open and close at appropriate times in synchronism with their rotation so as to clamp the leading edge of each sheet of substrate. In an embodiment of the invention, the tips of the grippers at least of impression cylinders 502 and 504 are designed not to project beyond the outer surface of the cylinders to avoid damaging blanket 102.

After an image has been impressed onto one side of a substrate sheet during passage between impression cylinder 502 and blanket 102 applied thereupon by pressure roller 140, the sheet is fed by a transport roller 522 to a perfecting cylinder 524 that has a circumference that is twice as large as the impression cylinders 502, 504. The leading edge of the sheet is transported by the perfecting cylinder past a transport roller 526, of which the grippers are timed to catch the trailing edge of the sheet carried by the perfecting cylinder and to feed the sheet to second impression cylinder 504 to have a second image impressed onto its reverse side. The sheet, which has now had images printed onto both its sides, can be advanced by a belt conveyor 530 from second impression cylinder 504 to the output stack 508.

In further embodiments not illustrated in the figures, the printed sheets may be subjected to one or more finishing steps either before being delivered to the output stack (inline finishing) or subsequent to such output delivery (offline finishing) or in combination when two or more finishing steps are performed. Such finishing steps include, but are not limited to laminating, gluing, sheeting, folding, glittering, foiling, protective and decorative coating, cutting, trimming, punching, embossing, debossing, perforating, creasing, stitching and binding of the printed sheets and two or more may be combined. As the finishing steps may be performed using suitable conventional equipment, or at least similar principles, their integration in the process and of the respective finishing stations in the systems of the invention will be clear to the person skilled in the art without the need for more detailed description.

As the images printed on the blanket are always spaced from one another by a distance corresponding to the circumference of the impression cylinders, the distance between the two impression cylinders 502 and 504 should also to be equal to the circumference of the impression cylinders 502, 504 or a multiple of this distance. The length of the individual images on the blanket is of course dependent on the size of the substrate not on the size of the impression cylinder.

In the embodiment shown in FIG. 5, a web 560 of the substrate is drawn from a supply roll (not shown) and passes over a number of guide rollers 550 with fixed axes and stationary cylinders 551 that guide the web past the single impression cylinder 502.

Some of the rollers over which the web 560 passes do not have fixed axes. In particular, on the in-feed side of the web 560, a roller 552 is provided that can move vertically. By virtue of its weight alone, or if desired with the assistance of a spring acting on its axle, roller 552 serves to maintain a constant tension in web 560. If, for any reason, the supply roller offers temporary resistance, roller 552 will rise and conversely roller 552 will move down automatically to take up slack in the web drawn from the supply roll.

At the impression cylinder, the web 560 is required to move at the same speed as the surface of the blanket. Unlike the embodiment described above, in which the position of the substrate sheets is fixed by the impression rollers, which assures that every sheet is printed when it reaches the impression rollers, if the web 560 were to be permanently engaged with blanket 102 at the impression cylinder 502, then much of the substrate lying between printed images would need to be wasted.

To mitigate this problem, there are provided, straddling the impression cylinder 502, two dancers 554 and 556 that are motorized and are moved up and down in opposite directions in synchronism with one another. After an image has been impressed on the web, pressure roller 140 is disengaged to allow the web 560 and the blanket to move relative to one another. Immediately after disengagement, the dancer 554 is moved downwards at the same time as the dancer 556 is moved up. Though the remainder of the web continues to move forward at its normal speed, the movement of the dancers 554 and 556 has the effect of moving a short length of the web 560 backwards through the gap between the impression cylinder 502 and the blanket 102 from which it is disengaged. This is done by taking up slack from the run of the web following impression cylinder 502 and transferring it to the run preceding the impression cylinder. The motion of the dancers is then reversed to return them to their illustrated position so that the section of the web at the impression cylinder is again accelerated up to the speed of the blanket. Pressure roller 140 can now be re-engaged to impress the next image on the web but without leaving large blank areas between the images printed on the web.

FIG. 5 shows a printer having only a single impression roller, for printing on only one side of a web. To print on both sides a tandem system can be provided, with two impression rollers and a web inverter mechanism may be provided between the impression rollers to allow turning over of the web for double sided printing. Alternatively, if the width of the blanket exceeds twice the width of the web, it is possible to use the two halves of the same blanket and impression cylinder to print on the opposite sides of different sections of the web at the same time.

Figure 6:
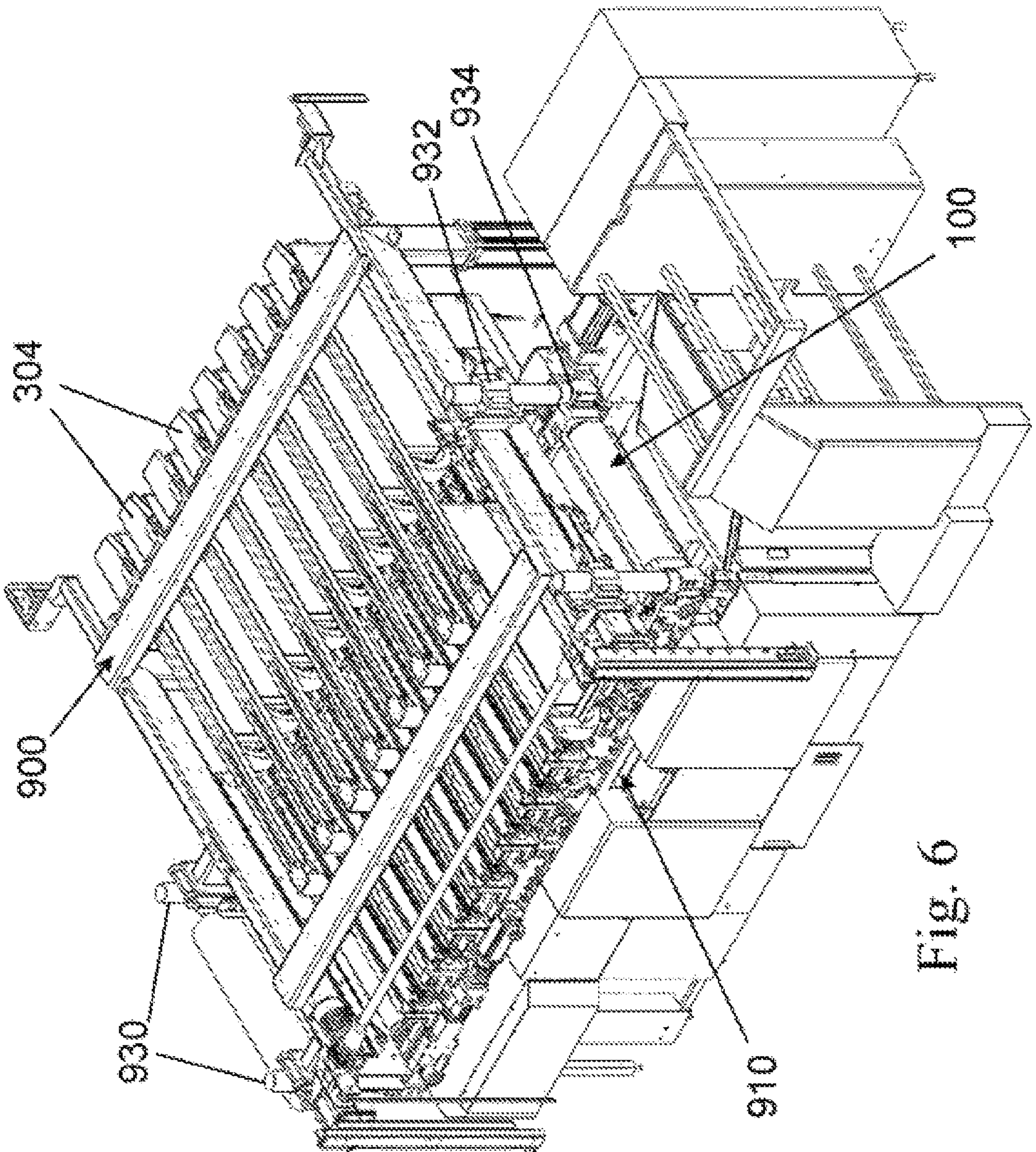
FIG. 6 is a perspective view of a printing system of FIG. 1 with a cover removed.
Figure 7:
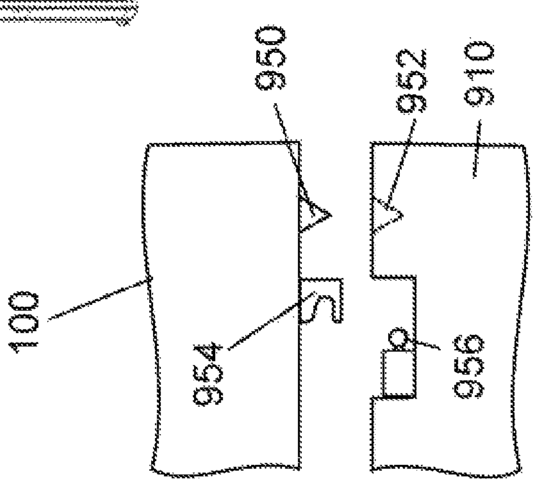
FIG. 7 is a schematic representation of a locking mechanism for the movable gantry in FIG. 6.
Figure 8:
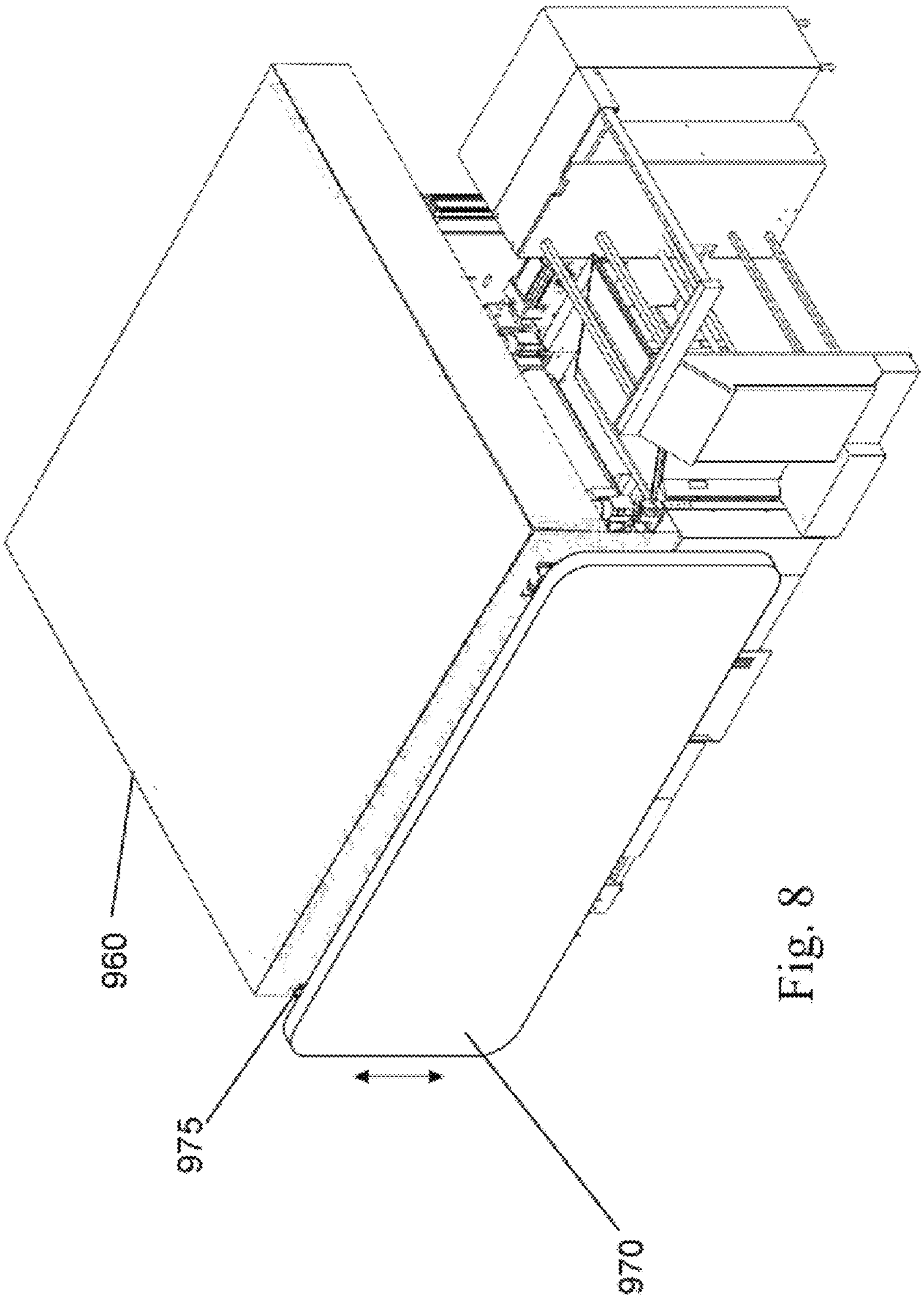
FIG. 8 is a schematic perspective view of a printing system with a cover and a display screen in place.

Referring now to FIGS. 6 to 8, in order to allow access to the various components of the printing system for maintenance, the image forming system 300 and the blanket system 100, are mounted on a common gantry 900, that is movable vertically relative to a base 910 that houses the substrate transport system 500, the gantry remaining horizontal and parallel to the impression cylinder(s) at all times as it is raised. The gantry 900 is a rigid structure to which the individual print bar frames 304 are secured. The print bar frames 304 overhang the base 910 of the printing system, the overhanging region being used to retain print bars that are not in current use. A motorized mechanism is provided within each frame 304 to move the associated print bar between its operative position overlying the blanket system 100 and the overhanging parked position.

The gantry 900 is supported on the base 910 of the printing system by means of hydraulic jacks 930 of which there are four, arranged one at each corner of the base 910. Each hydraulic jack 930 has a cylinder of which the upper end is secured to the gantry 900 by means of clamps 932 and a lower end secured to the blanket system 100 by means of clamps 934. The piston rod of each hydraulic jack 930 is movably secured to the base 910 of the printing system, a small degree of relative movement being provided to permit correct alignment of the blanket system 100 with the substrate transport system 500 when the printing system is in operation.

The piston rod of each jack is hollow and a coupling is provided at its lower end to permit hydraulic fluid to be introduced into, and drained from, the working chamber of the hydraulic jack. Because the hydraulic coupling is connected to a part of the printing system that is stationary, there is no need to resort to flexible pipes in the hydraulic circuit of the jacks 930.

Because the gantry 900 overhangs the base 910 of the printing system, its center of gravity does not lie symmetrically between the lifting jacks 930. In order to withstand the tendency of the gantry to tilt as it is being lowered and raised, it is possible to make the hydraulic jacks 930 of unequal hydraulic capacity. For example, in FIG. 6, if the hydraulic jacks 930 on the right of the base 910 are formed with a larger diameter working chamber than the hydraulic jacks on the left then the center of lift can be shifted to the right into closer alignment with the center of gravity of the gantry 900. The illustrated embodiment, however, resorts to additional hydraulic jacks which extend from the overhanging region of the gantry 900 to the ground.

In the operating position of the blanket system 100, it needs to be in correct alignment with the substrate transport system 500 and clamped to it. This may be achieved in the manner shown schematically in FIG. 7 which shows a locking mechanism similar to that used to lock together the halves of a mold of an injection molding machine. The alignment is achieved by means of a cone 950 on the blanket system 100 that is received within a conical depression 952 in the base 910. The conical angle of the cone 950 and the depression 952 are relatively large (greater than 5°) to avoid the risk of taper lock. Locking is achieved by a hydraulically or mechanically retractable tongue 956 that engages in a lateral notch in a catch 954 secured to the blanket system 100. The shape of the notch in the catch 954 defines an over center position for the tongue 956 to enable the blanket system to withstand the pressure applied at the nip that compresses the substrate against the blanket.

The printing systems in FIGS. 5 and 6 are shown with the blanket system 100 lowered into the position in which it contacts the substrate transport system 500. In this position images can be impressed on a substrate and the correct spacing is achieved between the blanket system 100 and the image forming system 300 for an ink image to be laid down accurately on the blanket. While in operation, a cover 960, shown as being semi-transparent in FIG. 8, encloses the image forming system 300 and blanket system 100, the cover being secured to the gantry 900 so as move up and down relative to the base 910 as the gantry 900 is raised and lowered.

The gantry 900 further slidably supports a display screen 970 that lies on the front of the printing system and is substantially as wide as the blanket system, or at least greater than one half of its width. This large area display screen 970 is used to display information to the operator and it may also be designed as a touch screen to enable the operator to input commands into the printing system. Rails 975 that slidably support the display screen 970 are mounted directly on the gantry 900 as shown in FIG. 6. Though the rails 975 are illustrated in this figure as having vertical orientation, thereby allowing the display screen to slide up and down so as either to block or to provide access to the inner parts of the printing system, the rails may instead be horizontal. Further details of suitable mounting of display screens and of method of use of display devices in connection with printing systems such as the herein disclosed are provided in co-pending PCT application No. PCT/IB2013/050245 (Agent's reference LIP 15/001 PCT).

Advantages Offered by the Process of the Invention

The described and illustrated embodiments of the invention provide several advantages both in terms of the process itself and the quality of the end product.

The aqueous ink compositions render the printing process more environmentally friendly.

Freezing the ink droplets impacting the intermediate transfer member enable formation of dried color dots that are thinner than those resulting from previously used printing processes or techniques, being typically no more than 500 nm or 600 nm or 700 nm or 800 nm in thickness. Aside from using less ink, the film is so thin that it closely follows the contours of the surface of the substrate and does not change its surface texture. Thus printing on a glossy substrate will produce a glossy image and when printing on a matte substrate the print areas will not be substantially glossier than non-print areas.

When each ink drop is flattened into a film, because it rests on a hydrophobic surface which is not solvated by the liquid in the image, surface tension will act to impart a smooth outline to the droplet. That sharp regular outline is retained as the droplet is dried and is reflected in the shape of the ink dots of the printed image on the substrate. Furthermore, the flattened shape has a more uniform color than dried color elements that are formed from droplets with a less uniform thickness.

When this is combined with the film forming characteristic of the polymer in the ink, the ink droplets and their uniform thinness provides a more ideal vehicle for forming high quality, high resolution images.

The combination of an aqueous ink and a hydrophobic release layer ensures that the surface of the blanket does not absorb any of the carrier. By contrast, in certain prior art processes, such absorption causes swelling of the blanket and distortion of its surface, which in turn imparts a textured or rough surface to the ink residue, detracting from the quality of the final printed image.

This is to be contrasted with the situation where each ink droplet wets the surface on which it lands, as for example, for colorants with organic carriers that utilize a hydrophobic transfer member or for transfer members that absorb the liquid or are hydrophilic and used in combination with aqueous inks. Such undesired excessive wetting causes the droplet to spread further into any irregularities that exist in the surface of the transfer member (and may cause such irregularities to form), with the result that each ink dot in the printed image is spidery, with tentacles and rivulets greatly increasing its perimeter as compared with that of a well rounded dot of the same area. The thickness of the film in such tentacles is necessarily thinner than at the center of each dot and the combination of these effects is to produce a blurred and ill-defined ink dot.

The film created by each droplet is impressed more reliably onto the substrate than a thicker layer of softened residue, as the risk of the layer splitting into two and part of it remaining on the blanket is reduced.

In general, ink jets printers require a trade-off between purity of the color, the ability to produce complete coverage of a surface and the density of the inkjet nozzles. If the dot created by each ink droplet is small, then, in order to obtain complete coverage, it is necessary to have closely spaced inkjet nozzles. In the process of the invention, to achieve full coverage, the separation of the inkjet nozzles need only be comparable with the size of the largest image dot that can be created by an ink droplet after it has been flattened by impacting the surface of the transfer member or at least after its size stabilizes.

Since the ink dots are distinct and adopt their final form in a very short time, the amount of bleeding between colors and interaction between droplets of the same color is reduced.

Figure 9:
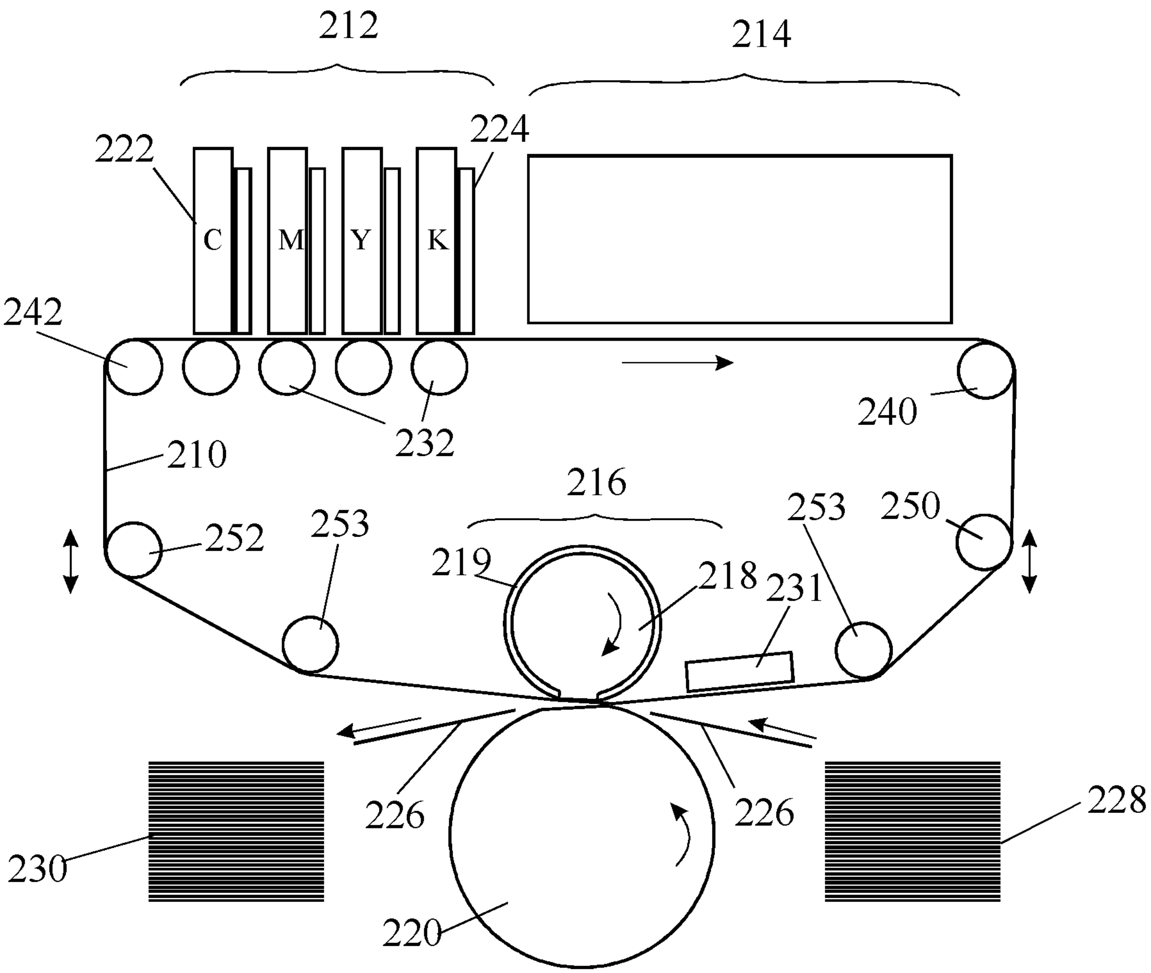
FIG. 9 is a schematic representation of a printing system of the invention in accordance with a second embodiment of the invention.
Figure 10:
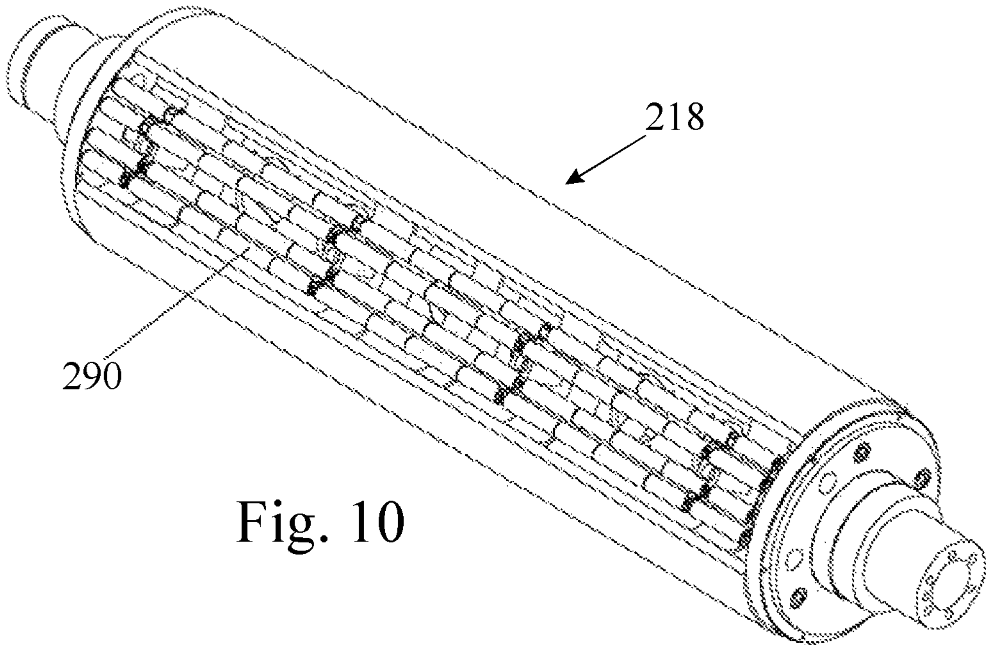
FIG. 10 is a perspective view of a pressure cylinder as used in the embodiment of FIG. 9 having rollers within the discontinuity between the ends of the blanket.

A printing system for printing on substrate sheets is shown in FIG. 9 which operates on the same principle as that of FIG. 1 but has an alternative architecture. The printing system of FIG. 9 comprises an endless belt 210 that cycles through an image forming station 212, a drying station 214, and an impression station 216. The image forming station 212 of FIG. 9 is similar to the previously described image forming system 300, illustrated for example in FIG. 1.

In the image forming station 212 four separate print bars 222 incorporating one or more print heads, that use inkjet technology, deposit aqueous ink droplets of different colors onto the surface of the belt 210. Though the illustrated embodiment has four print bars each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of gray including black) or for two print bars or more to deposit the same color (e.g. black). In a further embodiment, the print bar can be used for pigmentless liquids (e.g. decorative or protective varnishes) and/or for specialty colors (e.g. achieving visual effect, such as metallic, sparkling, glowing or glittering look or even scented effect). Following each print bar 222 in the image forming station, an intermediate drying system 224 is provided to blow hot gas (usually air) onto the surface of the belt 210 to dry the ink droplets partially. This hot gas flow assists in preventing blockage of the inkjet nozzles and also prevents the droplets of different color inks on the belt 210 from merging into one another. In the drying station 214, the ink droplets on the belt 210 are exposed to radiation and/or hot gas in order to dry the ink more thoroughly, driving off most, if not all, of the liquid carrier and leaving behind only a layer of resin and coloring agent which is heated to the point of being rendered tacky.

In the impression station 216, the belt 210 passes between an impression cylinder 220 and a pressure cylinder 218 that carries a compressible blanket 219. The length of the blanket 219 is equal to or greater than the maximum length of a sheet 226 of substrate on which printing is to take place. The impression cylinder 220 has twice the diameter of the pressure cylinder 218 and can support two sheets 226 of substrate at the same time. Sheets 226 of substrate are carried by a suitable transport mechanism (not shown in FIG. 9) from a supply stack 228 and passed through the nip between the impression cylinder 220 and the pressure cylinder 218. Within the nip, the surface of the belt 220 carrying the ink image is pressed firmly by the blanket 219 of the pressure cylinder 218 against the substrate so that the ink image is impressed onto the substrate and separated neatly from the surface of the belt. The substrate is then transported to an output stack 230.

In some embodiments, a heater 231 may be provided shortly prior to the nip between the two cylinders 218 and 220 of the image impression station to assist in rendering the ink film tacky, so as to facilitate transfer to the substrate.

As the optimum temperature of the belt 210 at the different stations is not necessarily the same, as well as provided heaters along its path, it is possible to provide means for cooling the belt, for example by blowing cold air or applying a cooling liquid onto its surface. In embodiments of the invention in which a treatment solution is applied to the surface of the belt, the treatment station may serve as a cooling station.

A particularly advantageous manner of applying the treatment solution is to direct a spray of the solution onto the surface of the belt and then to use an air knife to remove most, if not all, of the applied solution to leave only a coating of molecular thickness. In this case, both the spraying of the treatment solution and the removal of the surplus liquid would have a cooling effect on the surface of the belt.

The above description of the embodiment of FIG. 9 is simplified and provided only for the purpose of enabling an understanding of the present invention. For a successful printing system, the physical and chemical properties of the inks, the chemical composition and possible treatment of the release surface of the belt 210 and the control of the various stations of the printing system are all important but need not be considered in detail in the present context.

In order for the ink to separate neatly from the surface of the belt 210 it is necessary for the latter surface to have a hydrophobic release layer. In the embodiment of FIG. 1, this hydrophobic release layer is formed as part of a thick blanket that also includes a compressible conformability layer which is necessary to ensure proper contact between the release layer and the substrate at the impression station. The resulting blanket is a very heavy and costly item that needs to be replaced in the event a failure of any of the many functions that it fulfills.

In the embodiment of FIG. 9, the hydrophobic release layer forms part of a separate element from the thick blanket 219 that is needed to press it against the substrate sheets 226. In FIG. 9, the release layer is formed on the flexible thin inextensible belt 210 that is preferably fiber reinforced for increased tensile strength in its lengthwise dimension. The printing system of FIG. 9, which is described in greater detail in co-pending patent application PCT/IB2013/051718 (Agent's reference LIP 5/006 PCT) comprises an endless belt 210 that cycles through an image forming station 212, a drying station 214, and an impression station 216.

Figure 11:
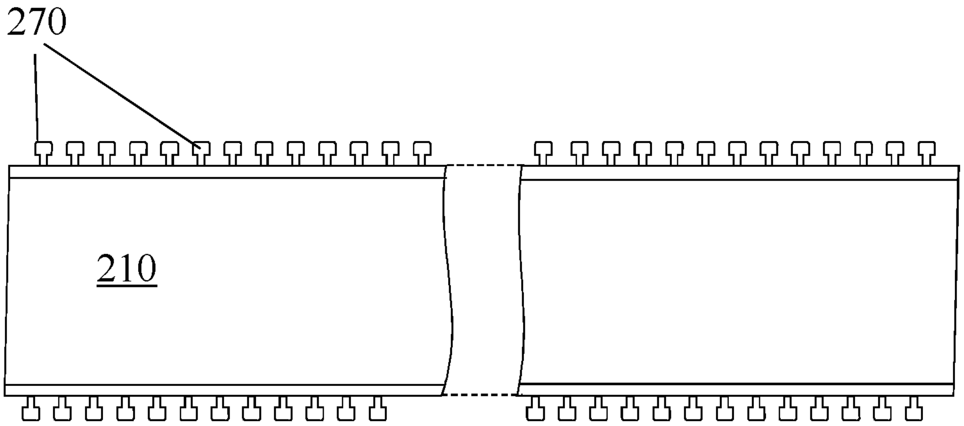
FIG. 11 is a plan view of a strip from which a belt is formed, the strip having teeth along its edges to assist in guiding the belt.
Figure 12:
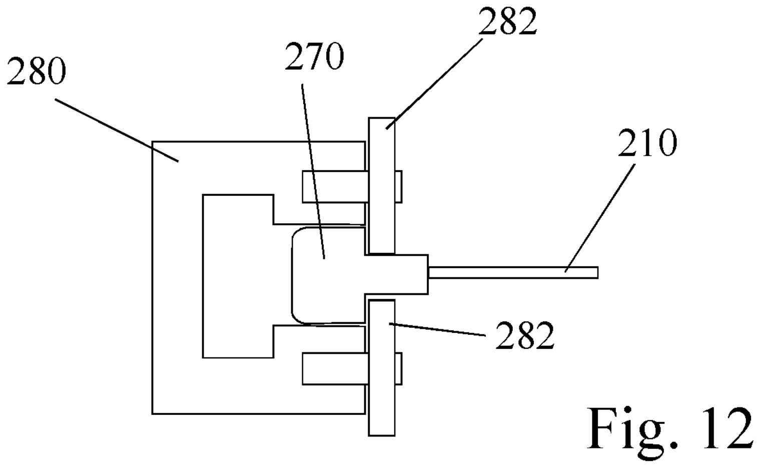
FIG. 12 is a section through a guide within which the teeth of the belt shown in FIG. 11 are received.

As shown schematically in FIGS. 11 and 12, the lateral edges of the belt 210 are provided in some embodiments of the invention with spaced formations or projections 270 which on each side are received in a respective guide channel 280 (shown in section in FIG. 12 and as track 180 in FIGS. 3-4) in order to maintain the belt taut in its width ways dimension. The projections 270 may be the teeth of one half of a zip fastener that is sewn or otherwise secured to the lateral edge of the belt. As an alternative to spaced projections, a continuous flexible bead of greater thickness than the belt 210 may be provided along each side. To reduce friction, the guide channel 280 may, as shown in FIG. 12, have rolling bearing elements 282 to retain the projections 270 or the beads within the channel 280.

The projections may be made of any material able to sustain the operating conditions of the printing system, including the rapid motion of the belt. Suitable materials can resist elevated temperatures in the range of about 50° C. to 250° C. Advantageously, such materials are also friction resistant and do not yield debris of size and/or amount that would negatively affect the movement of the belt during its operative lifespan. For example, the lateral projections can be made of polyamide reinforced with molybdenum disulfide.

Guide channels in the image forming station ensure accurate placement of the ink droplets on the belt 210. In other areas, such as within the drying station 214 and the impression station 216, lateral guide channels are desirable but less important. In regions where the belt 210 has slack, no guide channels are present.

All the steps taken to guide the belt 210 are equally applicable to the guiding of the blanket 102 in the embodiments of FIGS. 1 to 8, where the guide channel 280 was also referred to as track 180.

It is important for the belt 210 to move with constant speed through the image forming station 212 as any hesitation or vibration will affect the registration of the ink droplets of different colors. To assist in guiding the belt smoothly, friction is reduced by passing the belt over rollers 232 adjacent each print bar 222 instead of sliding the belt over stationary guide plates. The rollers 232 need not be precisely aligned with their respective print bars. They may be located slightly (e.g. few millimeters) downstream of the print head jetting location. The frictional forces maintain the belt taut and substantially parallel to print bars. The underside of the belt may therefore have high frictional properties as it is only ever in rolling contact with all the surfaces on which it is guided. The lateral tension applied by the guide channels need only be sufficient to maintain the belt 210 flat and in contact with rollers 232 as it passes beneath the print bars 222. Aside from the inextensible reinforcement/support layer, the hydrophobic release surface layer and high friction underside, the belt 210 is not required to serve any other function. It may therefore be a thin light inexpensive belt that is easy to remove and replace, should it become worn.

To achieve intimate contact between the hydrophobic release layer and the substrate, the belt 210 passes through the impression station 216 which comprises the impression and pressure cylinders 220 and 218. The replaceable blanket 219 releasably clamped onto the outer surface of the pressure cylinder 218 provides the conformability required to urge the release layer of the belt 210 into contact with the substrate sheets 226. Rollers 253 on each side of the impression station ensure that the belt is maintained in a desired orientation as it passes through the nip between the cylinders 218 and 220 of the impression station 216.

As explained above, temperature control is of paramount importance to the printing system if printed images of high quality are to be achieved. This is considerably simplified in the embodiment of FIG. 9 in that the thermal capacity of the belt is much lower than that of the blanket 102 in the embodiments of FIGS. 1 to 8.

It has also been proposed above in relation to the embodiment using a thick blanket 102 to include additional layers affecting the thermal capacity of the blanket in view of the blanket being heated from beneath. The separation of the belt 210 from the blanket 219 in the embodiment of FIG. 9 allows the temperature of the ink droplets to be dried and heated to the softening temperature of the resin using much less energy in the drying section 214. Furthermore, the belt may cool down before it returns to the image forming station which reduces or avoids problems caused by trying to spray ink droplets on a hot surface running very close to the inkjet nozzles. Alternatively and additionally, a cooling station may be added to the printing system to reduce the temperature of the belt to a desired value before the belt enters the image forming station. Cooling may be effected by passing the belt 210 over a roller of which the lower half is immersed in a coolant, which may be water or a cleaning/treatment solution, by spraying a coolant onto the belt of by passing the belt 210 over a coolant fountain.

Though, as explained, the temperature at various stage of the process may vary depending on the exact composition of the intermediate transfer member and inks being used and may even fluctuate at various locations along a given station, in some embodiments of the invention the temperature on the outer surface of the transfer member at the image forming station is in a range between 40° C. and 160° C., or between 60° C. and 90° C. In some embodiments of the invention, the temperature at the dryer station is in a range between 90° C. and 300° C., or between 150° C. and 250° C., or between 200° C. and 225° C. In some embodiments, the temperature at the impression station is in a range between 80° C. and 220° C., or between 100° C. and 160° C., or of about 120° C., or of about 150° C. If a cooling station is desired to allow the transfer member to enter the image forming station at a temperature that would be compatible to the operative range of such station, the cooling temperature may be in a range between 40° C. and 90° C.

In some embodiments of the invention, the release layer of the belt 210 has hydrophobic properties to ensure that the tacky ink residue image peels away from it cleanly in the impression station. However, at the image forming station the same hydrophobic properties are undesirable because aqueous ink droplets can move around on a hydrophobic surface and, instead of flattening on impact to form droplets having a diameter that increases with the mass of ink in each droplet, the ink tends to ball up into spherical globules. In embodiments with a release layer having a hydrophobic outer surface, steps therefore need to be taken to encourage the ink droplets first to flatten out into a disc on impact then to retain their flattened shape during the drying and transfer stages.

To achieve this objective, in all embodiments of the invention, it is desirable for the liquid ink to comprise a component chargeable by Brønsted-Lowry proton transfer, to allow the liquid ink droplets to acquire a charge subsequent to contact with the outer surface of the belt by proton transfer so as to generate an electrostatic interaction between the charged liquid ink droplets and an opposite charge on the outer surface of the belt. Such an electrostatic charge will fix the droplets to the outer surface of the belt and resist the formation of spherical globule.

The Van der Waals forces resulting from the Brønsted-Lowry proton transfer may result either from an interaction of the ink with a component forming part of the chemical composition of the release layer, such as amino silicones, or with a treatment solution, such as a high charge density PEI, that is applied to the surface of the belt 210 prior to its reaching the image forming station 212 (e.g. if the belt to be treated has a release layer comprising silanol-terminated polydialkylsiloxane silicones).

Without wishing to be bound by a particular theory, it is believed that upon evaporation of the ink carrier, the reduction of the aqueous environment lessens the respective protonation of the ink component and of the release layer or treatment solution thereof, thus diminishing the electrostatic interactions therebetween allowing the dried ink image to peel off from the belt upon transfer to substrate.

It is possible for the belt 210 to be seamless, that is it to say without discontinuities anywhere along its length. Such a belt would considerably simplify the control of the printing system as it may be operated at all times to run at the same surface velocity as the circumferential velocity of the two cylinders 218 and 220 of the impression station. Any stretching of the belt with ageing would not affect the performance of the printing system and would merely require the taking up of more slack by tensioning rollers 250 and 252, detailed below.

It is however less costly to form the belt as an initially flat strip of which the opposite ends are secured to one another, for example by a zip fastener or possibly by a strip of hook and loop tape or possibly by soldering the edges together or possibly by using tape (e.g. Kapton® tape, RTV liquid adhesives or PTFE thermoplastic adhesives with a connective strip overlapping both edges of the strip). In such a construction of the belt, it is essential to ensure that printing does not take place on the seam and that the seam is not flattened against the substrate 226 in the impression station 216.

The impression and pressure cylinders 218 and 220 of the impression station 216 may be constructed in the same manner as the blanket and impression cylinders of a conventional offset litho press. In such cylinders, there is a circumferential discontinuity in the surface of the pressure cylinder 218 in the region where the two ends of the blanket 219 are clamped. There are also discontinuities in the surface of the impression cylinder which accommodate grippers that serve to grip the leading edges of the substrate sheets to help transport them through the nip. In the illustrated embodiments of the invention, the impression cylinder circumference is twice that of the pressure cylinder and the impression cylinder has two sets of grippers, so that the discontinuities line up twice every cycle for the impression cylinder.

If the belt 210 has a seam, then it is necessary to ensure that the seam always coincides in time with the gap between the cylinders of the impression station 216. For this reason, it is desirable for the length of the belt 210 to be equal to a whole number multiple of the circumference of the pressure cylinder 218.

However, even if the belt has such a length when new, its length may change during use, for example with fatigue or temperature, and should that occur the phase of the seam during its passage through the nip will change every cycle.

To compensate for such change in the length of the belt 210, it may be driven at a slightly different speed from the cylinders of the impression station 216. The belt 210 is driven by two separately powered rollers 240 and 242. By applying different torques through the rollers 240 and 242 driving the belt, the run of the belt passing through the image forming station is maintained under controlled tension. The speed of the two rollers 240 and 242 can be set to be different from the surface velocity of the cylinders 218 and 220 of the impression station 216. Alternatively or additionally, the belt may be driven or moved by supporting surfaces that need not be cylindrical. For instance, instead of a rotating roller, the supporting surface may be planar and operative to cause a linear displacement of part of the belt. Independently of shape and type of movement generated on the supported portion of the belt, such guiding or driving means may be referred to collectively as supporting surfaces.

Two powered tensioning rollers, or dancers, 250 and 252 are provided one on each side of the nip between the cylinders of the impression station. These two dancers 250, 252 are used to control the length of slack in the belt 210 before and after the nip and their movement is schematically represented by double sided arrows adjacent the respective dancers.

If the belt 210 is slightly longer than a whole number multiple of the circumference of the pressure cylinder then if in one cycle the seam does align with the enlarged gap between the cylinders 218 and 220 of the impression station then in the next cycle the seam will have moved to the right, as viewed in FIG. 1. To compensate for this, the belt is driven faster by the rollers 240 and 242 so that slack builds up to the right of the nip and tension builds up to the left of the nip. To maintain the belt 210 at the correct tension, the dancer 250 is moved down and at the same time the dancer 252 is moved up. When the discontinuities of the cylinders of the impression station face one another and a gap is created between them, the dancer 252 is moved down and the dancer 250 is moved up to accelerate the run of the belt passing through the nip and bring the seam into the gap.

To reduce the drag on the belt 210 as it is accelerated through the nip, the pressure cylinder 218 may, as shown in FIG. 5, be provided with rollers 290 within the discontinuity region between the ends of the blanket.

The need to correct the phase of the belt in this manner may be sensed either by measuring the length of the belt 210 or by monitoring the phase of one or more markers on the belt relative to the phase of the cylinders of the impression station. The marker(s) may for example be applied to the surface of the belt that may be sensed magnetically or optically by a suitable detector. Alternatively, a marker may take the form of an irregularity in the lateral projections that are used to tension the belt and maintain it under tension, for example a missing tooth, hence serving as a mechanical position indicator.

It is further possible to incorporate into the belt an electronic circuit, for example a microchip similar to those to be found in "chip and pin" credit cards, in which data may be stored. The microchip may comprise only read only memory, in which case it may be used by the manufacturer to record such data as where and when the belt was manufactured and details of the physical or chemical properties of the belt. The data may relate to a catalog number, a batch number, and any other identifier allowing providing information of relevance to the use of the belt and/or to its user. This data may be read by the controller of the printing system during installation or during operation and used, for example, to determine calibration parameters. Alternatively, or additionally, the chip may include random access memory to enable data to be recorded by the controller of the printing system on the microchip. In this case, the data may include information such as the number of pages or length of web that have been printed using the belt or previously measured belt parameters such as belt length, to assist in recalibrating the printing system when commencing a new print run. Reading and writing on the microchip may be achieved by making direct electrical contact with terminals of the microchip, in which case contact conductors may be provided on the surface of the belt. Alternatively, data may be read from the microchip using radio signals, in which case the microchip may be powered by an inductive loop printed on the surface of the belt.

The printing system shown in FIG. 9 is intended for printing on individual substrate sheets. It is possible to use a similar system to print on a continuous web and in this case the pressure cylinder may, instead of having a blanket wrapped around part of its circumference, have a compressible continuous outer surface. Furthermore, no grippers need be incorporated in the impression cylinder.

Further details of monitoring methods suitable for printing systems such as the herein disclosed are provided in co-pending PCT application No. PCT/IB2013/051727 (Agent's reference LIP 14/001 PCT).

A further important advantage of printing systems of embodiments of the invention is that they may be produced by modification to existing lithographic printing presses. The ability to adapt existing equipment, while retaining much of the hardware already present, considerably reduces the investment required to convert from technology in common current use. In particular, in the case of the embodiment of FIG. 1, the modification of a tower would involve replacement of the plate cylinder by a set of print bars and replacement of the pressure cylinder by an image transfer drum having a hydrophobic outer surface or carrying a suitable blanket. In the case of the embodiment of FIG. 9, the plate cylinder would be replaced by a set of print bars and a belt passing between the existing plate and pressure cylinders. The substrate handling system would require little modification, if any. Color printing presses are usually formed of several towers and it is possible to convert all or only some of the towers to digital printing towers. Various configurations are possible offering different advantages. For example each of two consecutive towers may be configured as a multicolor digital printer to allow duplex printing if a perfecting cylinder is disposed between them. Alternatively, multiple print bars of the same color may be provided on one tower to allow an increased speed of the entire press.

The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise" "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "an impression station" or "at least one impression station" may include a plurality of impression stations.

The invention claimed is:

1. A method of operating a printing system comprising: (i) an intermediate transfer member (ITM) comprising an endless flexible belt having upper and lower runs, the belt passing over guide and drive rollers, (ii) an image forming station comprising a plurality of print bars and a plurality of gas-blowers wherein each gas-blower respectively follows a different associated print bar, and (iii) a main drying station which is disposed both downstream of the image forming station and above an upper run of the belt, the method comprising:

at the image forming station, depositing droplets of ink onto an outer surface of the ITM to form ink images thereon;

at the image forming station, respectively operating each gas-blower of the plurality of print-bar-associated gas-blowers to blow a respective gas-stream onto the ITM outer surface so as to only partially dry the deposited ink-droplets;

at the main drying station which is disposed both downstream of the image forming station and above the upper run of the belt, drying the ink images sufficiently to produce therefrom a residue film of ink solids, sufficient heat being delivered at the main drying station to render the residue film tacky; and at an impression station disposed downstream of the main drying station, transferring the tacky residue film from the ITM outer surface to substrate, wherein the method is performed such that:

(i) a maximum temperature of the ITM outer surface as it passes through the image forming station is defined as an imaging forming station maximum temperature (IFS-Temp$_{MAX}$); and (ii) as the ITM outer surface passes through the main drying station, the ITM outer surface reaches a temperature exceeding the imaging forming station maximum temperature (IFS-Temp$_{MAX}$); and (iii) the printing system which performs the method is configured such that a plurality of said guide rollers is disposed at the image forming station, each guide roller of said plurality of guide rollers being both (A) in contact with the upper run of the belt; and (B) disposed adjacent to a respective print bar of the image-forming station, wherein the method is performed such that at least one of a first condition, a second condition and a third condition is true, and wherein the first, second and third conditions are defined as follows:

A. according to the first condition, the intermediate transfer member (ITM), of the printing system which performs the method, further comprises lateral formations on the side edges of the member, the lateral formations compatible with guiding channels positioned at least at the image forming station to maintain the transfer member taut in its width ways direction;

B. according to the second condition, the printing system which performs the method is configured such that there is no gas-blower disposed immediately upstream of the most upstream print-bar of the image forming station; and C. according to the third condition, a hot gas is blown by the most upstream gas-blower of th he plurality of gas-blowers, said most upstream gas-blower following the most upstream print-bar of the plurality of print bars.

2. The method of claim 1 wherein a temperature of the ITM outer surface upon transfer of the tacky residue film therefrom to substrate at the impression station exceeds, by at least 10 degrees Celsius, the imaging forming station maximum temperature (IFS-Temp$_{MAX}$).

3. The method of claim 1 wherein the ink-droplet-depositing comprises depositing different ink colors sequentially and respectively to the ITM outer surface as the ITM outer surface passes through the image forming station, each ink color being applied by a different respective one of the print bars.

4. The method of claim 3 wherein for first and second of the print bars which respectively apply first and second colors, the gas blower associated with the first print bar blows gas onto the ITM outer surface: (i) after deposition thereon of ink of the first color by the first after and (ii) before reposition on the ITM outer surface of ink of the second color by the second print bars.

5. The method of claim 1, wherein the impression station of the printing system comprises a pressure cylinder having a compressible outer surface or carrying a compressible blanket and an impression cylinder and wherein the image transfer member (ITM) comprises an endless belt of greater length than the circumference of the pressure cylinder and passing through a nip between the impression and pressure cylinders and contacting the pressure cylinder over only a portion of the length of the endless belt.

6. The method of claim 1, wherein the intermediate transfer member is an endless blanket incorporating a compressible layer guided over guide rollers or supporting surfaces and having a run or a region thereof that is selectively deflectable by a movable nip roller to be urged against an impression cylinder.

7. The method of claim 1 wherein at least the first condition is true.

8. The method of claim 1 further comprising: before the depositing of the droplets of ink, applying a dilute solution of a charged polymer to the outer surface of the ITM.

9. The method of claim 1 wherein: before the depositing of the droplets of ink, applying a treatment solution to the outer surface of the ITM, and wherein at a time when the ink droplets are deposited on the ITM outer surface, a thickness of the treatment solution on the ITM outer surface is at most a few molecules.

10. The method of claim 1 wherein the printing system which performs the method is configured such that each of the plurality of the guide rollers disposed at the image-forming station is vertically aligned with a respective print bar in the image-forming station or disposed at most a few millimeters downstream therefrom.

11. The method of claim 1 wherein at least the second condition is true.

12. The method of claim 1 wherein at least the third condition is true.

13. A method of operating a printing system comprising: (i) an intermediate transfer member (ITM) comprising an endless flexible belt having upper and lower runs, the belt passing over guide and drive rollers, (ii) an image forming station comprising a plurality of print bars and a plurality of gas-blowers wherein each gas-blower respectively follows a different associated print bar, and (iii) a main drying station which is disposed both downstream of the image forming station and above an upper run of the belt, the method comprising:

at the image forming station, depositing droplets of ink onto an outer surface of the ITM to form ink images thereon;

at the image forming station, respectively operating each gas-blower of the plurality of print-bar-associated gas-blowers to blow a respective gas-stream onto the ITM outer surface so as to only partially dry the deposited ink-droplets;

at the main drying station which is disposed both downstream of the image forming station and above the upper run of the belt, drying the ink images sufficiently to produce therefrom a residue film of ink solids, sufficient heat being delivered at the main drying station to render the residue film tacky; and at an impression station disposed downstream of the main drying station, transferring the tacky residue film from the ITM outer surface to substrate, wherein the intermediate transfer member (ITM), of the printing system which performs the method, further comprises lateral formations on the side edges of the member, the lateral formations compatible with guiding channels positioned at least at the image forming station to maintain the transfer member taut in its width ways direction.

14. The method of claim 13 wherein the printing system which performs the method is configured such that a plurality of said guide rollers is disposed at the image forming station, each guide roller of said plurality of guide rollers being both: (i) in contact with the upper run of the belt; and (ii) disposed adjacent to a respective print bar of the image-forming station.

15. The method of claim 14 wherein the printing system which performs the method is configured such that there is no gas-blower disposed immediately upstream of the most upstream print-bar of the image forming station.

16. The method of claim 13 wherein the printing system which performs the method is configured such that there is no gas-blower disposed immediately upstream of the most upstream print-bar of the image forming station.

17. The method of claim 16 wherein a hot gas is blown by the most upstream gas-blower of the plurality of gas-blowers, said most upstream gas-blower following the most upstream print-bar of the plurality of print bars.

18. The method of claim 13 wherein a hot gas is blown by the most upstream gas-blower of the plurality of gas-blowers, said most upstream gas-blower following the most upstream print-bar of the plurality of print bars.

19. A method of operating a printing system comprising: (i) an intermediate transfer member (ITM) comprising an endless flexible belt having upper and lower runs, the belt passing over guide and drive rollers, (ii) an image forming station comprising a plurality of print bars and a plurality of gas-blowers wherein each gas-blower respectively follows a different associated print bar, and (iii) a main drying station which is disposed both downstream of the image forming station and above an upper run of the belt, the method comprising:

at the image forming station, depositing droplets of ink onto an outer surface of the ITM to form ink images thereon;

at the image forming station, respectively operating each gas-blower of the plurality of print-bar-associated gas-blowers to blow a respective stream of gas onto the ITM outer surface so as to only partially dry the deposited ink-droplets, wherein a hot gas is blown by the most upstream gas-blower of the plurality of gas-blowers, said most upstream gas-blower following the most upstream print-bar of the plurality of print bars;

at the main drying station which is disposed both downstream of the image forming station and above the upper run of the belt, drying the ink images sufficiently to produce therefrom a residue film of ink solids, sufficient heat being delivered at the main drying station to render the residue film tacky; and at an impression station disposed downstream of the main drying station, transferring the tacky residue film from the ITM outer surface to substrate, wherein the printing system which performs the method is configured such that a plurality of said guide rollers is disposed at the image forming station, each guide roller of said plurality of guide rollers being both: (i) in contact with the upper run of the belt and (ii) disposed adjacent to a respective print bar of the image-forming station.

20. The method of claim 19 wherein the printing system which performs the method is configured such that there is no gas-blower disposed immediately upstream of the most upstream print-bar of the image forming station.

21. The method of claim 20 wherein a hot gas is blown by the most upstream gas-blower of the plurality of gas-blowers, said most upstream gas-blower following the most upstream print-bar of the plurality of print bars.

22. The method of claim 19 wherein a hot gas is blown by the most upstream gas-blower of the plurality of gas-blowers, said most upstream gas-blower following the most upstream print-bar of the plurality of print bars.

23. The method of claim 22 wherein the printing system which performs the method is configured such that each of the plurality of the guide rollers disposed at the image-forming station is vertically aligned with a respective print bar in the image-forming station or disposed at most a few millimeters downstream therefrom.

24. The method of claim 19 wherein the printing system which performs the method is configured such that each of the plurality of the guide rollers disposed at the image-forming station is vertically aligned with a respective print bar in the image-forming station or disposed at most a few millimeters downstream therefrom.

* * * * *